US008566594B2

(12) United States Patent
Soliman et al.

(10) Patent No.: US 8,566,594 B2
(45) Date of Patent: Oct. 22, 2013

(54) POWER SAVINGS THROUGH COOPERATIVE OPERATION OF MULTIRADIO DEVICES

(75) Inventors: Samir S. Soliman, San Diego, CA (US); Nishith Chaubey, San Diego, CA (US); Olufunmilola O. Awoniyi, San Diego, CA (US); Ramanathan Viswanathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 12/759,920

(22) Filed: Apr. 14, 2010

(65) Prior Publication Data
US 2011/0255692 A1 Oct. 20, 2011

(51) Int. Cl.
G06F 21/00 (2013.01)
(52) U.S. Cl.
USPC ............ 713/171; 380/270; 380/273; 380/274
(58) Field of Classification Search
USPC ........................... 713/168, 171; 380/273–274
See application file for complete search history.

(56) References Cited

U.S. PATENT DOCUMENTS

| 5,978,366 | A | 11/1999 | Massingill et al. |
| 6,519,447 | B1 | 2/2003 | Chang et al. |
| 6,968,153 | B1 | 11/2005 | Heinonen et al. |
| 7,269,629 | B2 | 9/2007 | Zmudzinski et al. |
| 7,349,355 | B2 | 3/2008 | Sengupta et al. |
| 7,629,963 | B1 | 12/2009 | Wright |
| 2003/0198196 | A1 | 10/2003 | Bahl et al. |
| 2004/0063451 | A1 | 4/2004 | Bonta et al. |
| 2004/0203377 | A1 | 10/2004 | Eaton et al. |
| 2005/0079817 | A1 | 4/2005 | Kotola et al. |
| 2006/0092888 | A1 | 5/2006 | Jeong et al. |
| 2006/0140196 | A1 | 6/2006 | Tanaka et al. |
| 2006/0218396 | A1* | 9/2006 | Laitinen et al. ............... 713/167 |
| 2006/0293079 | A1 | 12/2006 | Bahl et al. |
| 2007/0004436 | A1 | 1/2007 | Stirbu |
| 2007/0015523 | A1 | 1/2007 | Prakash et al. |

(Continued)

FOREIGN PATENT DOCUMENTS

CN 200966070 Y 10/2007
CN 101114861 B 12/2010

(Continued)

OTHER PUBLICATIONS

Partial International Search Report—PCT/US2011/032553, ISA/EPO—Jul. 26, 2011.

(Continued)

Primary Examiner — Benjamin Lanier
(74) Attorney, Agent, or Firm — Charles Chesney

(57) ABSTRACT

Trust establishment in short range protocol pairing between client and proxy devices includes a first aspect in which application level security is used to encrypt all packets transmitted between the client and proxy. An application-based security derives a public key from the General Bootstrapping Architecture (GBA) and used that public key to generate an encryption key in an AES encryption algorithm. A second aspect provides for out of band security to be used to establish short range protocol pairing. In this second aspect, the client and proxy exchange identification information over a third party network that is out of band to the short range protocol. With this identification information exchanged out of band, the client and proxy may establish pairing in the short range protocol.

12 Claims, 22 Drawing Sheets

(56) References Cited

U.S. PATENT DOCUMENTS

| | | |
|---|---|---|
| 2007/0105496 A1 | 5/2007 | Bonta et al. |
| 2007/0189256 A1 | 8/2007 | Oh |
| 2007/0204160 A1* | 8/2007 | Chan et al. .................. 713/171 |
| 2007/0234041 A1* | 10/2007 | Lakshmeshwar et al. .... 713/156 |
| 2007/0242647 A1 | 10/2007 | Bennett |
| 2008/0016230 A1* | 1/2008 | Holtmanns et al. ........... 709/229 |
| 2008/0189440 A1 | 8/2008 | Goyal et al. |
| 2008/0259912 A1 | 10/2008 | Wang et al. |
| 2008/0261529 A1 | 10/2008 | Rosenblatt |
| 2009/0017844 A1 | 1/2009 | Li et al. |
| 2009/0209232 A1* | 8/2009 | Cha et al. ..................... 455/411 |
| 2009/0219844 A1 | 9/2009 | Soliman |
| 2009/0221261 A1 | 9/2009 | Soliman |
| 2009/0221303 A1 | 9/2009 | Soliman |
| 2009/0325622 A1 | 12/2009 | Matsumura et al. |
| 2010/0203905 A1 | 8/2010 | Chaubey et al. |
| 2010/0271978 A1 | 10/2010 | Gupta et al. |
| 2011/0131414 A1* | 6/2011 | Cheng et al. .................. 713/170 |
| 2011/0255444 A1 | 10/2011 | Soliman et al. |
| 2011/0256891 A1 | 10/2011 | Soliman et al. |
| 2011/0264913 A1* | 10/2011 | Nikander et al. ............. 713/168 |

FOREIGN PATENT DOCUMENTS

| | | |
|---|---|---|
| GB | 2396525 B | 5/2006 |
| JP | 2000102069 A | 4/2000 |
| JP | 2003521135 A | 7/2003 |
| JP | 2007096988 | 4/2007 |
| JP | 2007140590 A | 6/2007 |
| WO | 0042807 A1 | 7/2000 |
| WO | 2007056467 A1 | 5/2007 |
| WO | WO2009009385 | 1/2009 |
| WO | WO2009130796 A1 | 10/2009 |

OTHER PUBLICATIONS

International Search Report and Written Opinion—PCT/US2011/032553—ISA/EPO—Nov. 8, 2011.

Chaubey, U.S. Appl. No. 12/366,883, entitled, "Partitioned Proxy Server for Facilitating Power Conservation in Wireless Client Terminals" filed Feb. 6, 2009.

* cited by examiner

POWER SAVINGS THROUGH COOPERATIVE OPERATION OF MULTIRADIO DEVICES

CROSS-REFERENCE TO RELATED APPLICATIONS

This application is related to commonly-assigned, co-pending U.S. patent application Ser. No. 12/041,644, filed Mar. 3, 2008, entitled, "PROXY SERVER FOR FACILITATING POWER CONSERVATION IN WIRELESS CLIENT TERMINALS," U.S. patent application Ser. No. 12/041,649, filed Mar. 3, 2008, entitled, "ACCESS POINT WITH PROXY FUNCTIONALITY FOR FACILITATING POWER CONSERVATION IN WIRELESS CLIENT TERMINALS," U.S. patent application Ser. No. 12/041,655, filed Mar. 3, 2008, entitled, "FACILITATING POWER CONSERVATION IN WIRELESS CLIENT TERMINALS," U.S. patent application Ser. No. 12/366,883, filed Feb. 6, 2009, entitled, "PARTITIONED PROXY SERVER FOR FACILITATING POWER CONSERVATION IN WIRELESS CLIENT TERMINALS," U.S. patent application Ser. No. 12/759,916, entitled, "POWER SAVINGS THROUGH COOPERATIVE OPERATION OF MULTIRADIO DEVICES," in the names of S. SOLIMAN et al., and U.S. patent application Ser. No. 12/759,921, entitled, "POWER SAVINGS THROUGH COOPERATIVE OPERATION OF MULTIRADIO DEVICES," in the names of S. SOLIMAN et al., the disclosures of which are expressly incorporated by reference herein in their entireties.

TECHNICAL FIELD

The present disclosure is related, in general, to wireless communication systems, and, more particularly, to the cooperative operation of multiradio devices.

BACKGROUND

In the beginning of modern wireless telecommunications, a briefcase-sized "mobile" device allowed users to make phone calls into the historic public switched telephone network (PSTN). Since this early beginning, wireless technology has advanced with mobile phones becoming smaller and more powerful, while mobile networks have advanced data download speeds and bandwidth capabilities. These mobile systems are to the point that mobile phones are now typically considered mobile or wireless devices that have merged traditional phones with portable computers. Mobile devices are capable of running complex software applications and often have multiple wireless access technologies to communicate voice and data using both short-range and long-range wireless systems. With this decrease in size and substantial increase in processing power and memory, the power demands of new mobile devices are now generally balanced against the power available from smaller batteries; which keep getting smaller to fit into the smaller, more complex devices. Therefore, battery life and power management are keys to continuing the advancement of the mobile revolution.

In considerations of future wireless networks, i.e., more advanced versions of 3G and beyond, the Third Generation Partnership Project (3GPP) considers the Universal Mobile Telecommunications System (UMTS) as a strong candidate for future high speed packet data networks in its Long Term Evolution (LTE) systems. In most mobile communication networks, including UMTS, power management at the wireless device or user equipment (UE) is extremely important to support a high rate of multimedia packet services. Thus, the preservation of battery power greatly affects both the mobility of the wireless device and the quality of service (QoS) received.

Several power saving mechanisms have been proposed for extending the battery life in mobile devices. One such method that has been implemented is the use of a sleep or idle mode in mobile devices. When in standby mode (i.e., the mode in which there are no active transmissions or active downloads occurring at the device) and there is no data scheduled for transmission over the wireless link between the mobile device and base station, the mobile device transitions into a sleep or idle mode. The idle mode physically or electronically shuts down power to as many functional units as possible within the mobile device. Idle mode, then, typically consumes the power used to maintain the essential device resources, such as volatile memory and the systems that monitor the paging and control channels of the wireless network.

One application used with this idle mode mechanism in UMTS is discontinuous reception (DRX). In DRX, the network typically assigns a unique paging indicator (PI) that will be broadcasted once per paging message schedule or paging occasion (PO) during the DRX cycle. Because the mobile device knows its unique PI and knows when the PO occurs during a particular DRX cycle length, the mobile device may enter idle mode and, when the PO time arises, the device wakes up temporarily and powers the long-range receiver to monitor the paging channel (PCH) for its PI and any paging messages. Paging messages may include messages that alert the mobile device to the occurrence of an incoming call, changes to control/overhead messages that carry system information and other information for the mobile device, and the like. If there is no paging message, the device reenters the idle mode and waits for the next scheduled PO transmission. This sequence of switching functional parts of the mobile device on and off during the idle mode is often referred to as the slotted mode of operation.

Similarly, system designers generally select to institute particular slot cycles or POs based on balancing the effects of power savings vs. phone responsiveness. Longer slot cycles or POs increase power savings as the receiver and other non-essential functional parts of the mobile device may be shut down longer. However, the longer slot cycle also means that it will take longer for the mobile device to recognize that it has incoming messages. Conversely, shorter slot cycles or POs increase the responsiveness of the mobile device to its pages, but does not conserve as much power.

Because most wireless devices are not constantly receiving or transmitting data, they spend a large majority of their time in idle mode. However, as noted, idle mode includes a constant and systematic cycle of start-ups and idle-downs of the long-range receiver to check for paging messages. The long-range receiver is a power hungry part of a mobile device. While the ability to conserve battery power during the idle times provides a power-saving benefit, the constant cycling of the device on and off still draws a non-negligible amount of power from the battery. For example, in wireless devices compliant with Code Division Multiple Access (CDMA) (including Wideband Code Division Multiple Access (W-CDMA)) and/or Global System for Mobile Communications (GSM) standards, current consumption in idle mode may be as high as a few milli-amperes (mA) as a result of the long-range receiver cycling on and off. As a result of this current consumption, the available battery power still decreases at a non-negligible rate during idle time, thus, shortening the useful mobility of the device.

BRIEF SUMMARY

Representative embodiments of the present teachings are directed to methods for discovering at least one proxy device in a network having cooperative multiradio devices. These methods include entering a probe mode at a client multiradio device, wherein the probe mode is in a short range communication protocol and transmitting, according to a predetermined schedule, a multiple probe packets in the short range communication protocol to the proxy devices on a list of proxy devices stored at the client multiradio device. The methods further include transmitting a list of proxy identifiers (IDs) to a network server in which the IDs identify each of the proxy devices discovered during the probe mode, wherein the client multiradio device transmits the list of proxy IDs using a long range communication protocol. A network server represents one or more computing devices that provide the processing and operational functionality for the communication network. Network servers include, for example, network base stations, bootstrapping servers, and other such network entities.

Further representative embodiments of the present teachings are directed to methods for discovering at least one proxy device in a network having cooperative multiradio devices. These methods include entering a scan mode at a client multiradio device, wherein the scan mode is in a short range communication protocols and receiving, according to a predetermined schedule, at least one probe packet in the short range communication protocol from one of the proxy devices on a list of proxy devices stored at the client multiradio device. The methods further include transmitting a list of proxy identifiers (IDs) to a network server in which the IDs identify each of the proxy devices discovered during the scan mode, wherein the client multiradio device transmits the list of proxy IDs using a long range communication protocol.

Further representative embodiments of the present teachings are directed to multiradio devices that include a processor, at least one short range interface coupled to the processor, at least one long range interface coupled to the processor, an antenna array coupled to the short range interface and the long range interface, a power source coupled to the processor, a storage device coupled to the processor, and a proxy discovery application stored on the storage device. When executed by the processor, the proxy discovery application configures the multiradio device to enter a probe mode using the short range interface, transmit, according to a predetermined schedule, probe packets using the short range interface to at least one available proxy on a proxy list maintained at the multiradio device, and send at least one proxy identifier (ID) to a network server where the IDs identify the available proxies discovered during the probe mode. The executed proxy discovery application also configures the multiradio device to send the proxy IDs using the long range interface.

Further representative embodiments of the present teachings are directed to multiradio devices that include a processor, at least one short range interface coupled to the processor, at least one long range interface coupled to the processor, an antenna array coupled to the short range interface and the long range interface, a power source coupled to the processor, a storage device coupled to the processor, and a proxy discovery application stored on the storage device. When executed by the processor, the proxy discovery application configures the multiradio device to enter a scan mode using the short range interface, receive, according to a predetermined schedule, at least one probe packet over the short range interface from one of the available proxies on a proxy list maintained at the multiradio device, and send at least one proxy identifier (ID) to a network server where the IDs identify the available proxies discovered during the scan mode. The executed proxy discovery application also configures the multiradio device to send the proxy IDs using the long range interface.

Further representative embodiments of the present teachings are directed to computer readable media. The computer readable media has program code tangibly stored thereon. This program code includes code to enter a probe mode at a client multiradio device, wherein the probe mode is in a short range communication protocol, code to transmit, according to a predetermined schedule, probe packets in the short range communication protocol to the proxy devices on a list of proxy devices stored at the client multiradio device, and code to transmit a list of proxy identifiers (IDs) to a network server where the IDs identify each of the proxy devices discovered during the probe mode. Executing the code to transmit causes the client multiradio device to transmit the list of proxy IDs using a long range communication protocol.

Further representative embodiments of the present teachings are directed to computer readable media. The computer readable media has program code tangibly stored thereon. This program code includes code to enter a scan mode at a client multiradio device, wherein the scan mode is in a short range communication protocol, code to receive, according to a predetermined schedule, at least one probe packet over the short range communication protocol from one of the proxy devices on a list of proxy devices stored at the client multiradio device, and code to transmit a list of proxy identifiers (IDs) to a network server where the IDs identify each of the proxy devices discovered during the scan mode. Executing the program code to transmit causes the client multiradio device to transmit the list of proxy IDs using a long range communication protocol.

Further representative embodiments of the present teachings are directed to multiradio devices that include means for entering a probe mode at a client multiradio device, wherein the probe mode is in a short range communication protocol, and means for transmitting, according to a predetermined schedule, probe packets in the short range communication protocol to the proxy devices on a list of proxy devices stored at the client multiradio device. The multiradio devices further include means for transmitting a list of possible proxy identifiers (IDs) to a network server where the IDs identify each of the proxy devices discovered during the probe mode. The client multiradio device transmits the list of proxy IDs using a long range communication protocol.

Further representative embodiments of the present teachings are directed to multiradio devices that include means for entering a scan mode at a client multiradio device, wherein the scan mode is in a short range communication protocol, and means for receiving, according to a predetermined schedule, at least one probe packet in the short range communication protocol from one of the proxy devices on a list of proxy devices stored at the client multiradio device. These multiradio devices further include means for transmitting a list of proxy identifiers (IDs) to a network server where the IDs identify each of the proxy devices discovered during the scan mode. The client multiradio device transmits the list of proxy IDs using a long range communication protocol.

Further representative embodiments of the present teachings are directed to methods for managing proxy devices in a network having cooperative multiradio devices. These methods include receiving proxy registration identifiers (registration IDs) from the proxy devices at a network server, generating a list of proxy devices responsive to the registration IDs at the network server, and providing the list of proxy devices to at least one multiradio device coupled to the network server.

Further representative embodiments of the present teachings are directed to network servers that include a processor, a communication interface coupled to the processor, wherein the communication interface uses a long range communication protocol, an antenna array coupled to the communication interface, a storage device coupled to the processor, a discovery application stored on the storage device. When executed by the processor, the discovery application configures the network server to generate a proxy device list from at least one proxy identifier (ID) received from at least one available proxy device. The executing discovery application also configures the network server to provide the proxy device list to at least one multiradio device coupled to the network server.

Further representative embodiments of the present teachings are directed to computer readable media. The computer readable media has program code tangibly stored thereon. This program code at a network server includes code to receive registration identifiers (IDs) from several proxy devices at a network server, code to generate a list of proxy devices in response to receiving the registration IDs, and code to provide the list of proxy devices to at least one multiradio device coupled to the network server.

Further representative embodiments of the present teachings are directed to network server. Such network servers include means for receiving registration identifiers (IDs) from a plurality of proxy devices, means for generating a list of proxy devices in response to receiving the registration IDs, and means for providing the list of proxy devices to at least one multiradio device coupled to the network server.

Further representative embodiments of the present teachings are directed to methods for discovering at least one available proxy device in a network having cooperative multiradio devices. These methods include scanning by a client device in a short range communication protocol for multiradio devices within a wireless proximity to the client device and transmitting to a network server from the client device in a long range communication protocol a list of the multiradio devices detected in response to the scanning. The methods further include receiving a modified proxy list from the network server at the client device over the long range communication protocol, wherein the modified proxy list is a subset of the plurality of multiradio devices available as a proxy to the client device. Once the client device has received the modified proxy list, the methods further include connecting to one of the proxy devices of the modified proxy list and transmitting the proxy identifier (ID) to the network server over the long range communication protocol.

Further representative embodiments of the present teachings are directed to multiradio devices that include a processor, at least one short range interface coupled to the processor, at least one long range interface coupled to the processor, an antenna array coupled to the short range interface and the long range interface, a power source coupled to the processor, a storage device coupled to the processor, and a proxy discovery application stored on the storage device. When executed by the processor, the proxy discovery application configures the multiradio device to scan in a short range communication protocol for possible multiradio proxy devices within a wireless proximity to the multiradio device, transmit to a network server in the long range communication protocol a list of possible multiradio proxy devices detected in response to the scan and receive a modified proxy list from network server over the long range communication protocol, wherein the modified proxy list is a subset of the multiradio proxy devices that are available to the multiradio device. The executing proxy discovery application further configures the multiradio device to connect to one of the proxy devices of the modified proxy list and transmit the proxy identifier (ID) to the network server over the long range communication protocol.

Further representative embodiments of the present teachings are directed to computer readable media. The computer readable media has program code tangibly stored thereon. This program code includes code to scan by a client device in a short range communication protocol for multiradio devices within a wireless proximity to the client device, code to transmit to a network server in a long range communication protocol a list of the multiradio devices detected in response to execution of the code to scan, and code to receive a modified proxy list from the network server at the client device over the long range communication protocol, wherein the modified proxy list is a subset of the multiradio devices available as a proxy to the client device. The program code further includes code to connect to one of the proxy devices of the modified proxy list and code to transmit the proxy identifier (ID) to the network server over the long range communication protocol.

Further representative embodiments of the present teachings are directed to multiradio devices that include means for scanning at a client device in a short range communication protocol for multiradio devices within a wireless proximity to the client device, means for transmitting to a network server in a long range communication protocol a list of the multiradio devices detected in response to the means for scanning, and means for receiving a modified proxy list from network server at the client device over the long range communication protocol, wherein the modified proxy list is a subset of the plurality of multiradio devices available as a proxy to the client device. The multiradio devices further include means for connecting to one of the proxy devices of the modified proxy list and means for transmitting the proxy identifier (ID) to the network server over the long range communication protocol.

Further representative embodiments of the present teachings are directed to methods of establishing trust between a client multiradio device and a proxy device. These methods include receiving a request for a bootstrapping transaction identifier (B_TID) at the client multiradio device from the proxy device, wherein the request includes a client network application function (NAF) identifier (ID) and transmitting the client NAF ID and the B_TID from the client multiradio device to the proxy device using a short range communication protocol. The methods further include receiving public key information from the proxy device and confirming the public key information at the client device over the short range communication protocol, wherein the public key information is generated by a network server and communicated over a long range communication protocol to the proxy device, and calculating an encryption key using the public key information.

Further representative embodiments of the present teachings are directed to multiradio devices that include a processor, at least one short range interface coupled to the processor, at least one long range interface coupled to the processor, an antenna array coupled to the short range interface and the long range interface, a power source coupled to the processor, a storage device coupled to the processor, and a trust establishment application stored on the storage device. When executed by the processor, the trust establishment application configures the multiradio device to receive a request for a bootstrapping transaction identifier (B_TID) over the antenna array from the proxy device, wherein the request includes a client network application function (NAF) identifier (ID), and transmit the client NAF ID and the B_TID from the multiradio device to the proxy device using the short range interface. The executing trust establishment application further configures the multiradio device to receive and confirm public key information from the proxy device over the short range interface, wherein the public key information is generated by a network server and communicated over a long range communication protocol to the proxy device, and to calculate an encryption key using the public key information.

Further representative embodiments of the present teachings are directed to computer readable media. The computer readable media has program code tangibly stored thereon. This program code includes code to receive a request for a bootstrapping transaction identifier (B_TID) at a client multiradio device from the proxy device, wherein the request includes a client network application function (NAF) identifier (ID), and code to transmit the client NAF ID and the B_TID from the client multiradio device to the proxy device using a short range communication protocol. The program code further includes code to receive and confirm public key information from the proxy device over the short range communication protocol, wherein the public key information is generated by a network server and is communicated over a long range communication protocol to the proxy device, and code to calculate an encryption key using the public key information.

Further representative embodiments of the present teachings are directed to methods of establishing trust between a client multiradio device and a proxy device. These methods include transmitting a request to the client multiradio device for a bootstrapping transaction identifier (B_TID) over a short range communication protocol from the proxy device, wherein the request includes a client network application function (NAF) identifier (ID). The methods further include receiving the client NAF ID and the B_TID from the client multiradio device over the short range communication protocol and then transmitting a proxy ID of the proxy device and the B_TID to a network server over a long range communication protocol. The methods also include receiving public key information over the long range communication protocol from the network server, wherein the public key information is calculated by the network server based in part on the proxy ID and the B_TID, transmitting over the short range communication protocol the public key information from the proxy device to the client multiradio device, and calculating an encryption key using the public key information.

Further representative embodiments of the present teachings are directed to multiradio proxy devices that include a processor, at least one short range interface coupled to the processor, at least one long range interface coupled to the processor, an antenna array coupled to the short range interface and the long range interface, a power source coupled to the processor, a storage device coupled to the processor, and a trust establishment application stored on the storage device. When executed by the processor, the trust establishment application configures the multiradio proxy device to transmit a request to a client multiradio device for a bootstrapping transaction identifier (B_TID) over the short range interface, wherein the request includes a client network application function (NAF) identifier (ID), and to receive the client NAF ID and the B_TID from the client multiradio device over the short range interface. The executing trust establishment application further configures the multiradio proxy devices to transmit over the long range interface a proxy ID of the multiradio proxy device and the B_TID to a network server and receive public key information over the long range interface from the network server, wherein the public key information is calculated by the network server based in part on the proxy ID and the B_TID. The executing trust establishment application further configures the multiradio proxy device to transmit the public key information to the client multiradio device over the short range interface and calculate an encryption key using the public key information.

Further representative embodiments of the present teachings are directed to computer readable media. The computer readable media has program code tangibly stored thereon. This program code includes code to transmit a request to a client multiradio device for a bootstrapping transaction identifier (B_TID) over a short range communication protocol from a multiradio proxy device, wherein the request includes a client network application function (NAF) identifier (ID), and code to receive the client NAF ID and the B_TID from the client multiradio device at the multiradio proxy device over the short range communication protocol, and code to transmit over a long range communication protocol a proxy ID of the multiradio proxy device and the B_TID to a network server. The program code further includes code to receive public key information over the long range communication protocol from the network server, wherein the public key information is calculated by the network server based in part on the proxy ID and the B_TID, code to transmit over the short range communication protocol the public key information from the multiradio proxy device to the client multiradio device, and code to calculate an encryption key using the public key information.

Further representative embodiments of the present teachings are directed to methods of establishing trust between a client multiradio device and a proxy device. These methods include receiving by the client multiradio device discovery information for the proxy device over a short range communication protocol, transmitting a client identifier (ID) and client security information to the proxy device using a network communication protocol that is out-of-band from the short range communication protocol, receiving a proxy ID and proxy security information from the proxy device over the network communication protocol, and establishing a pairing of the client multiradio device and the proxy device over the short range communication protocol using the proxy ID and the proxy security information.

Further representative embodiments of the present teachings are directed to client multiradio devices. These client multiradio devices include a processor, at least one short range interface coupled to the processor, at least one long range interface coupled to the processor, an antenna array coupled to the short range interface and the long range interface, a power source coupled to the processor, a storage device coupled to the processor, and a trust establishment application stored on the storage device. When executed by the processor, the trust establishment application configures the client multiradio device to receive discovery information for the proxy device over short range communication protocol, transmit a client identifier (ID) and client security information to the proxy device using a network communication protocol that is out of band from the short range communication protocol, receive a proxy ID and proxy security information from the proxy device over the network communication protocol, and establish a pairing of the client multiradio device and the proxy device over the short range communication protocol using the proxy ID and the proxy security information.

Further representative embodiments of the present teachings are directed to computer readable media. The computer readable media has program code tangibly stored thereon. This program code includes code at a client multiradio device to receive discovery information for a multiradio proxy device over a short range communication protocol, code at the client multiradio device to transmit a client identifier (ID) and client security information to the multiradio proxy device using a network communication protocol that is out of band from the short range communication protocol, code at the client multiradio device to receive a proxy ID and proxy security information from the multiradio proxy device over the network communication protocol, and code at the client multiradio device to establish a pairing of the client multiradio device and the proxy device over the short range communication protocol using the proxy ID and the proxy security information.

Further representative embodiments of the present teachings are directed to client multiradio devices include means operable by the client multiradio device for receiving discovery information for a multiradio proxy device over a short range communication protocol, means operable by the client multiradio device for transmitting a client identifier (ID) and client security information to the multiradio proxy device using a network communication protocol that is out of band from the short range communication protocol, means operable by the client multiradio device for receiving a proxy ID and proxy security information from the multiradio proxy device over the network communication protocol, and means operable by the client multiradio device for establishing a pairing of the client multiradio device and the multiradio proxy device over the short range communication protocol using the proxy ID and the proxy security information.

Further representative embodiments of the present teachings are directed to methods of establishing trust between a client multiradio device and a proxy device. These methods include receiving a request from the client multiradio device for discovery information over a short range communication protocol, transmitting a proxy identifier (ID) and proxy security information to the client multiradio device using a network communication protocol that is out of band from the short range communication protocol, receiving a client ID and client security information from the client multiradio device over the network communication protocol, and establishing a pairing of the client multiradio device and the proxy device over the short range communication protocol using the proxy ID and the proxy security information.

Further representative embodiments of the present teachings are directed to proxy devices that include a processor, at least one short range interface coupled to the processor, at least one long range interface coupled to the processor, an antenna array coupled to short range interface and the long range interface, a power source coupled to the processor, a storage device coupled to the processor, and a trust establishment application stored on the storage device. When executed by the processor, the trust establishment application configures the proxy device to receive a request from a client multiradio device for discovery information over a short range communication protocol and transmit a proxy identifier (ID) and proxy security information to the client multiradio device using a network communication protocol that is out of band from the short range communication protocol. The executing trust establishment application further configures the proxy device to receive a client ID and client security information from the client multimedia device over the network communication protocol and establish a pairing of the client multiradio device and the proxy device over the short range communication protocol using the proxy ID and the proxy security information.

Further representative embodiments of the present teachings are directed to computer readable media. The computer readable media has program code tangibly stored thereon. This program code includes code at a proxy device to receive a request from a client multiradio device for discovery information over a short range communication protocol, code at the proxy device to transmit a proxy identifier (ID) and proxy security information to the client multiradio device using a network communication protocol that is out of band from the short range communication protocol, code at the proxy device to receive a client ID and client security information from the client multimedia device over the network communication protocol, and code at the proxy device to establish a pairing of the client multiradio device and the proxy device over the short range communication protocol using the proxy ID and the proxy security information.

Further representative embodiments of the present teachings are directed to proxy devices that include means operable by the proxy device for receiving a request from a client multiradio device for discovery information over a short range communication protocol, means operable by the proxy device for transmitting a proxy identifier (ID) and proxy security information to the client multiradio device using a network communication protocol that is out of band from the short range communication protocol, means operable by the proxy device for receiving a client ID and client security information from the client multimedia device over the network communication protocol, and means operable by the proxy device for establishing a pairing of the client multiradio device and the proxy device over the short range communication protocol using the proxy ID and the proxy security information.

Further representative embodiments of the present teachings are directed to methods for a proxy device to monitor client device pages. These methods include receiving client identifiers (IDs), page schedules, and value tags of master and system information blocks (MIB/SIBs) regarding each of at least one client device having a proxy relationship with said proxy device, receiving at the proxy device page scheduling information from a network server, transmitting a deep sleep command to the at least one client device using a short range communication protocol, and monitoring the page scheduling information for each of the at least one client device using a long range communication protocol. The methods further include transmitting tracking area (TA)/location area (LA) and registration updates to a network server on behalf of the at least one client device, wherein the transmitting is over the long range communication protocol and is performed when current TA/LA and registration data update is necessary, i.e., due to expiration of periodic TA/LA update timer or UE TA/LA changes, and, in response to detecting a page message for one of the client devices over the long range communication protocol, transmitting a wake up signal to the at least one client device using the short range communication protocol.

Further representative embodiments of the present teachings are directed to multiradio proxy devices that include a processor, at least one short range interface coupled to the processor, at least one long range interface coupled to the processor, an antenna array coupled to the short range interface and the long range interface, a power source coupled to the processor, a storage device coupled to the processor, a client list stored on the storage device, and page monitoring settings stored on the storage device. When executed by the processor, the page monitoring settings configure the multiradio proxy devices to receive client identifiers (IDs), page schedules, and value tags of master and system information blocks (MIB/SIBs) regarding each of at least one client device having a proxy relationship with the proxy device, receive at the proxy device page scheduling information from a network server, transmit a deep sleep command to client device using a short range communication protocol, and monitor the page scheduling information for each client device using a long range communication protocol. The executing page monitoring settings further configure the multiradio proxy devices to transmit tracking area (TA)/location area (LA) and registration updates to a network server on behalf of the at least one client device, wherein the transmitting is over the long range communication protocol and is performed when current TA/LA and registration data update is necessary, i.e., due to expiration of periodic TA/LA update timer or UE TA/LA changes, and transmit a wake up signal to the at least one client device using the short range communication protocol, in response to detecting a page message for one of the client devices over the long range communication protocol.

Further representative embodiments of the present teachings are directed to computer readable media. The computer readable media has program code tangibly stored thereon. This program code includes code to receive client identifiers (IDs), page schedules, and value tags of master and system information blocks (MIB/SIBs) regarding each of at least one client device having a proxy relationship with said proxy device, code to receive at the proxy device page scheduling information from a network server, code to transmit a deep sleep command to the client devices using a short range communication protocol, code to monitor the page scheduling information for each of the client devices using a long range communication protocol. The program code further includes code to transmit tracking area (TA)/location area (LA) and registration updates to a network server on behalf of the client devices, wherein the transmitting is over the long range communication protocol, and is performed when current TA/LA and registration data update is necessary, i.e., due to expiration of periodic TA/LA update timer or UE TA/LA changes, and code, executable in response to detecting a page message for one of the client devices over the long range communication protocol, to transmit a wake up signal to the client device using the short range communication protocol.

Further representative embodiments of the present teachings are directed to multiradio proxy devices. These multiradio proxy devices include means for receiving client identifiers (IDs), page schedules, and value tags of master and system information blocks (MIB/SIBs) regarding each of at least one client device having a proxy relationship with the proxy device, means for receiving at the proxy device page scheduling information from a network server, means for transmitting a deep sleep command to the client device using a short range communication protocol, and means for monitoring the page scheduling information for each client device using a long range communication protocol. The multiradio proxy devices further include means for transmitting tracking area (TA)/location area (LA) and registration updates to a network server on behalf of the client device, wherein the transmitting is over the long range communication protocol and is performed when current TA/LA and registration data update is necessary, i.e., due to expiration of periodic TA/LA update timer or UE TA/LA changes, and means, in response to detecting a page message for one of the client devices over the long range communication protocol, for transmitting a wake up signal to the client device using the short range communication protocol.

Further representative embodiments of the present teachings are directed to methods for transitioning a multiradio client device to a deep sleep mode. These methods include receiving a deep sleep signal at the multiradio client device from a proxy device over a short range communication protocol, receiving a proxy page message schedule with the deep sleep signal, entering the deep sleep mode in response to the deep sleep signal, and receiving a wake up signal from the proxy device over the short range communication protocol, wherein the wake up signal is received based on a page received by the proxy device from a network server. The methods further include, in response to the wake up signal, responding to the page received from the network server. The methods further include, in response to short range communication between the proxy device and the multiradio client device unintentionally terminating prior to receiving the wake up signal, beginning to monitor for page messages by the multiradio client device over a long range communication protocol using the proxy page message schedule, receiving a state change signal from a network server over the long range communication protocol, and, in response to the state change signal, beginning to monitor for the page messages using an original client page message schedule.

Further representative embodiments of the present teachings are directed to multiradio client devices that include a processor, at least one short range interface coupled to the processor, at least one long range interface coupled to the processor, an antenna array coupled to the short range interface and the long range interface, a power source coupled to the processor, a storage device coupled to the processor, a proxy list stored on the storage device, and a client page message monitor application stored on the storage device. When executed by the processor, the client page message monitor application configures the multiradio client device to receive a deep sleep signal from a proxy device over a short range communication protocol, receive a proxy page message schedule with the deep sleep signal, and enter a deep sleep mode in response to the deep sleep signal. The executing client page message monitor application further configures the multiradio client device to receive a wake up signal from the proxy device over the short range communication protocol, wherein the wake up signal is transmitted by the proxy device based on a page received by the proxy device from a network server and to respond to the page received from the network server. The executing client page message monitor application further configures the multiradio client device to begin to monitor for page messages over a long range communication protocol, in response to short range communication between the proxy device and the multiradio client device unintentionally terminating prior to receiving the wake up signal, where the multiradio client device uses the proxy page message schedule. The executing client page message monitor application further configures the multiradio client device to begin to monitor for the page messages using an original client page message schedule in response to receiving a state change signal from the network server over the long range communication protocol.

Further representative embodiments of the present teachings are directed to computer readable media. The computer readable media has program code tangibly stored thereon. This program code includes code, at a multiradio client device, to receive a deep sleep signal from a proxy device over a short range communication protocol, code, at the multiradio client device, to receive a proxy page message schedule with the deep sleep signal, and code, at the multiradio client device, to enter a deep sleep mode in response to the deep sleep signal. The program code further includes code, at the multiradio client device, to receive a wake up signal from the proxy device over the short range communication protocol, wherein the wake up signal is received based on a page received by the proxy device from a network server, and code, at the multiradio client device, to respond to the page. The program code further includes code, at the multiradio client device, executable in response to short range communication between the proxy device and the multiradio client device unintentionally terminating prior to receiving the wake up signal, to begin monitoring for page messages at the multiradio client device over a long range communication protocol using the proxy page message schedule, code, at the multiradio client device, to receive a state change signal from a network server over the long range communication protocol, and code, at the multiradio client device, executable in response to the state change signal, to begin monitoring for the page messages using an original client page message schedule.

Further representative embodiments of the present teachings are directed to multiradio client devices. These devices include means for receiving a deep sleep signal at the multiradio client device from a proxy device over a short range communication protocol, means for receiving a proxy page message schedule with the deep sleep signal, and means for entering a deep sleep mode in response to the deep sleep signal. The multiradio client devices further include means for receiving a wake up signal at the multiradio client device from the proxy device over the short range communication protocol, wherein the wake up signal is received based on a page received by the proxy device from a network server, and means for responding to the page. The multiradio client devices further include means, executable in response to short range communication between the proxy device and the multiradio client device unintentionally terminating prior to receiving the wake up signal, for beginning to monitor for page messages at the multiradio client device over a long range communication protocol using the proxy page message schedule, means for receiving a state change signal from a network server over the long range communication protocol, and means, executable in response to the state change signal, for beginning to monitor for the page messages using an original client page message schedule.

Further representative embodiments of the present teachings are directed to methods for managing proxy paging schedules. These methods include receiving at a network server a notification of a proxy relationship between a proxy device and at least one client device, generating, in response to the notification, a new proxy paging schedule within which page messages for each of the at least one client device will be transmitted, transmitting the new proxy paging schedule to the proxy device, and initiating page message transmission for the at least one client device using the new proxy paging schedule.

Further representative embodiments of the present teachings are directed to network servers that include a processor, a communication interface coupled to the processor, wherein the communication interface uses a long range communication protocol, an antenna array coupled to the communication interface, a storage device coupled to the processor, and a page message scheduling generator stored on the storage device. When executed by the processor, the page message scheduling generator configures the network server to receive a notification of a proxy relationship between a proxy device and at least one client device, generate, in response to the notification, a new proxy paging schedule within which page messages for each of the client devices will be transmitted, transmit the new proxy paging schedule to the proxy device, and initiate page message transmission for the client devices using the new proxy paging schedule.

Further representative embodiments of the present teachings are directed to computer readable media. The computer readable media has program code tangibly stored thereon. This program code includes code at a network server to receive a notification of a proxy relationship between a proxy device and at least one client device, code, executable in response to the notification, to generate a new proxy paging schedule within which page messages for each of the at least one client device will be transmitted, code to transmit the new proxy paging schedule to the proxy device, and code to initiate page message transmission for the at least one client device using the new proxy paging schedule.

Further representative embodiments of the present teachings are directed to network servers that include means for receiving a notification of a proxy relationship between a proxy device and at least one client device, means, in response to the notification, for generating a new proxy paging schedule within which page messages for each client device will be transmitted, means for transmitting the new proxy paging schedule to the proxy device, and means for initiating page message transmission for the client devices using the new proxy paging schedule.

The foregoing has outlined rather broadly the features and technical advantages of the present teachings in order that the detailed description that follows may be better understood. Additional features and advantages will be described hereinafter which form the subject of the claims. It should be appreciated by those skilled in the art that the conception and specific embodiments disclosed may be readily utilized as a basis for modifying or designing other structures for carrying out the same purposes of the present teachings. It should also be realized by those skilled in the art that such equivalent constructions do not depart from the technology of the teachings as set forth in the appended claims. The novel features which are believed to be characteristic of the teachings, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present teachings.

BRIEF DESCRIPTION OF THE DRAWINGS

For a more complete understanding of the present teachings, reference is now made to the following description taken in conjunction with the accompanying drawings.

DETAILED DESCRIPTION

While various processes and methods have been proposed and incorporated into wireless devices in order to conserve power source power, one common factor for many wireless devices is that they are often in close proximity to another wireless electronic device. That device may be a mobile phone, a laptop computer, a netbook, smartbook, PDA, wireless repeater, femtocell, a wireless hub or router, or the like. Many of these other wireless electronic devices are multiradio devices having access to multiple types of wireless systems. Wireless systems may be long range systems, which in a mobile telecommunications system, can be CDMA, W-CDMA, GSM, the WiMAX Forum's Worldwide Interoperability for Microwave Access (WIMAX™), Long Term Evolution (LTE), and the like, or short range systems, such as Bluetooth Special Interest Group's (SIG) BLUETOOTH™, Nokia Oyj's WIBREE™, the Wifi Aliance's WIFI™, Zigbee Aliance (Zigbee) and the like, in addition to the various protocols falling within the Institute of Electrical and Electronics Engineers' (IEEE) standards IEEE 802.11 and IEEE 802.15 short range wireless protocols, and personal area networks (PANs), and the like. In general, the device systems used to enable the long range communication protocols consume higher power than the device systems used to enable the short range communication protocols. Thus, these multiradio devices are capable of communicating over their high power interfaces with the overlying wireless network and communicating directly with each other over their low power interfaces.

The various embodiments of the present teachings operate in a system that leverages other wireless devices located within a close wireless proximity of a mobile device to provide a power saving proxy server. The technology for this power saving proxy server is described in commonly-assigned, co-pending U.S. patent application Ser. No. 12/041,644, entitled, "PROXY SERVER FOR FACILITATING POWER CONSERVATION IN WIRELESS CLIENT TERMINALS;" U.S. patent application Ser. No. 12/041,649, entitled, "ACCESS POINT WITH PROXY FUNCTIONALITY FOR FACILITATING POWER CONSERVATION IN WIRELESS CLIENT TERMINALS;" U.S. patent application Ser. No. 12/041,655, entitled, "FACILITATING POWER CONSERVATION IN WIRELESS CLIENT TERMINALS;" and U.S. patent application Ser. No. 12/366,883, entitled, "PARTITIONED PROXY SERVER FOR FACILITATING POWER CONSERVATION IN WIRELESS CLIENT TERMINALS," the disclosures of which are incorporated herein for all purposes.

Figure 1:
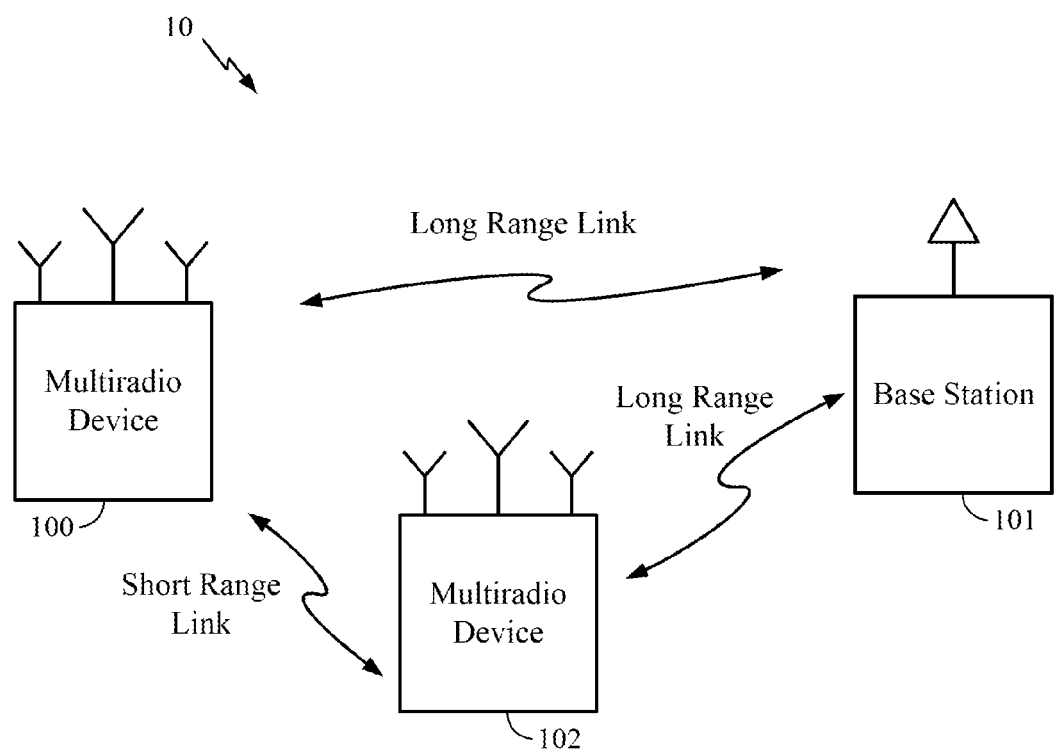
FIG. 1, a block diagram illustrates a wireless network configured according to one embodiment of the present teachings.

Turning now to FIG. 1, a block diagram illustrates a wireless network 10 configured according to one embodiment of the present teachings. In normal operation, a multiradio device 100 communicates over its high power interface to establish long range radio frequency (RF) links with a base station 101, which provides access to the wireless network 10. Long range communications may be implemented by a number of different long range communications protocols, depending on which protocol is selected by the wireless network 10. The multiradio device 100 receives network management signals as well as communication signals transmitted by the base station 101. The multiradio device 100 also includes other long range and short range wireless systems.

The multiradio device 100 also includes a low power interface having a short range antenna that may be used to establish a short range communication link with other wireless or mobile devices, such as the multiradio device 102.

In operation according to the illustrated embodiment of the present teachings, as the multiradio device 100 enters the electronically accessible proximity of the multiradio device 102, a proxy discovery process occurs involving each of the multiradio devices 100 and 102 and base station 101. A trust establishment process proceeds between the multiradio devices 100 and 102 in which identity information is exchanged. Once this information has been successfully exchanged, the multiradio device 102 operates as a proxy server for the multiradio device 100 with the base station 101. The multiradio device 100 receives a signal prompting it to enter a deep sleep mode. The deep sleep mode places the multiradio device 100 into a deeper idle mode, where the multiradio device 100 shuts down all but its most critical functional parts and its low power interface and does not operate its high power interface as it would do in normal mode of operation. At the same time, the multiradio device 102 begins to monitor the paging channel (PCH) from the base station 101 on behalf of the multiradio device 100. Thus, the multiradio device 102 monitors for the PI assigned to the multiradio device 100 during the PO/slotted cycle of the wireless network 10. When the multiradio device 102 detects the PI assigned to the multiradio device 100 and finds a paging message directed to the multiradio device 100, the multiradio device 102 then transmits a wake up signal or a page to the multiradio device 100 via its low power interface to wake it up from the deep sleep and begin accessing or responding to the message or call through its high power interface. In the meantime, however, the multiradio device 100 has conserved a considerable amount of power more than it would have if operating in the slotted mode because it has been able to reduce the amount of time that the high power interface is active during idle time.

The multiradio device 102 may be any variety of wireless devices. For example, the multiradio device 102 may be a laptop computer, a desktop computer, a dedicated proxy server, a mobile phone, or other such mobile device. These various devices may be classified as either a power sensitive device or a dedicated power device. Power sensitive devices will usually operate on battery power or some other mechanism for storing power. As with the multiradio device 100, considerations are made to conserve power even in such power sensitive devices operating as proxy servers. One consideration that may be part of the proxy rules is that the power sensitive device that is being considered for a proxy should have a greater power capacity than the requesting mobile device. For example, if the battery powering the multiradio device 100 is almost out of charge, the multiradio device 102 may be another mobile, battery-operated device that has a greater battery charge than the multiradio device 100. However, as the battery power of the multiradio device 102 is reduced by a certain amount, it may signal the multiradio device 100 that the proxy relationship is going to be terminated, allowing the multiradio device 100 to establish a proxy relationship with another available multiradio device in the area or resume monitoring for its own pages.

A dedicated power device, on the other hand, receives power from a constant power supply, such as by being coupled to the alternating current (AC) power grid. Such dedicated power devices will have few to no power conserving directives for its operation as a proxy server. Various numbers of multiradio devices, such as the multiradio device 100, may connect to such a dedicated power device as its proxy server without regard to the power consumption rate from the dedicated power proxy.

Figure 2A:
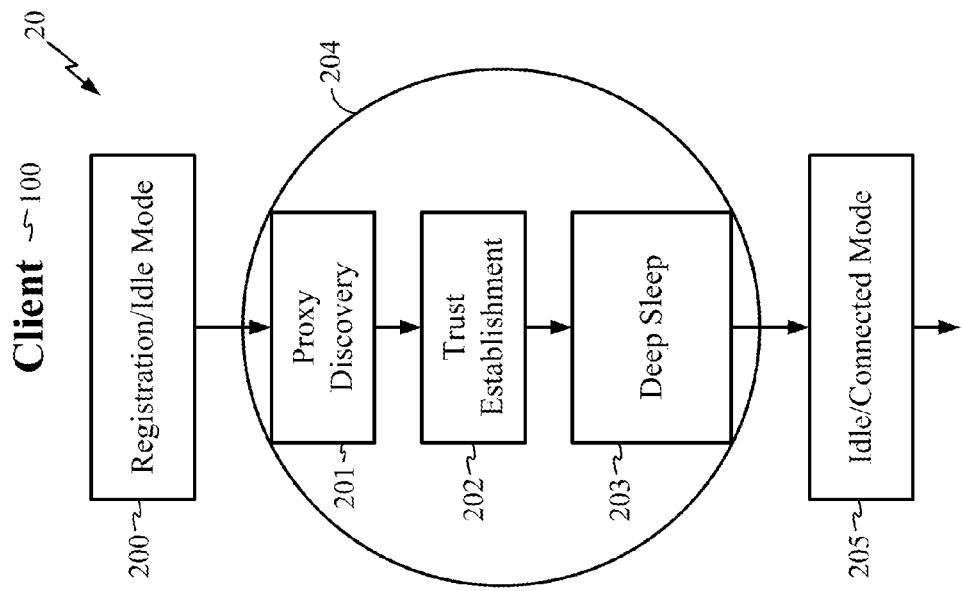
FIG. 2A is an operational flow diagram illustrating the general operational blocks in which the multiradio device operates according to one embodiment of the present teachings.

FIG. 2A is an operational flow diagram illustrating the general operational blocks 20 in which the multiradio device 100 operates according to one embodiment of the present teachings. In the operational block 200, the multiradio device 100 registers with wireless network 10 (FIG. 1) and, when no active messages are being processed, enters into its idle state. In the proxy discovery operational block 201, the multiradio device 100 obtains a list of the available wireless devices that can operate as proxy servers for the multiradio device 100 (FIG. 1). Depending on the embodiment of the present teachings implemented in the wireless network 10, during the proxy discovery operational block 201, the multiradio device 100 may: (1) request the proxy list from the wireless network 10 through the base station 101 (FIG. 1); (2) discover all available potential wireless proxies in its area and send a list of those devices to the wireless network 10, which will then transmit a sublist of the available or authorized proxies identified by the multiradio device 100; or (3) receive a proxy list from the wireless network 10 in the broadcast of master and system information blocks (MIB/SIBs).

Once the multiradio device 100 has the proxy list resulting from the proxy discovery operational block 201, the multiradio device 100 enters into the trust establishment operational block 202. A certain level of security or trust should be established between a client and its proxy before any valuable or sensitive subscriber information and/or identities are exchanged between the two devices.

Again, depending on the embodiment of the present teachings implemented in the wireless network 10 (FIG. 1), during the trust establishment operational block 202, the security or trust level may be established (1) using a public key encryption, derived from the general bootstrapping architecture (GBA) defined by the 3GPP for 3G wireless systems, as input into the Advanced Encryption Standard (AES) encryption algorithm used in UMTS to generate an encryption key used as an application layer encryption key for all packets transmitted between the client and proxy; or (2) using an out-of-band security defined by the short range communication protocol that involves the exchange of security parameters and identities.

After the appropriate security has been enabled between the client and the proxy, the multiradio device 100 enters into the deep sleep operational block 203. As noted above, a deep sleep is more power conservative than a typical idle mode with slotted mode operation. The multiradio device 100 shuts down all of its non-essential systems, including the high power long range interface components, and only keeps power to the critical components and the low power short range interface components. The low power short range interface components of the multiradio device 100 monitor communications from its proxy, i.e., the multiradio device 102.

When the proxy detects a paging message for the multiradio device 100, it signals the multiradio device 100 through the low power short range interface components to wake up and, if necessary, forwards the MIB/SIBs that were modified since the multiradio device 100 went into deep sleep, and the paging message to the multiradio device 100. As the multiradio device 100 wakes up from deep sleep and begins processing the forwarded MIB/SIBs and paging message, the multiradio device 100 then enters the idle/connected mode operational block 205. If the paging message results in receiving a call or receiving a data message, the multiradio device 100 would then enter an active state (not shown).

The proxy discovery operational block 201, trust establishment operational block 202, and deep sleep operational block 203 together form the proxy operation mode 204 of a client device, i.e., the multiradio device 100, in the wireless network 10 (FIG. 1). During these operational blocks of the proxy operation mode 204, the multiradio device 100 is able to conserve more power relative to the amount of power it would have been able to conserve in a typical idle mode because its high power long range interface components are powered down and remain powered down during the deep sleep operational block 203.

Figure 2B:
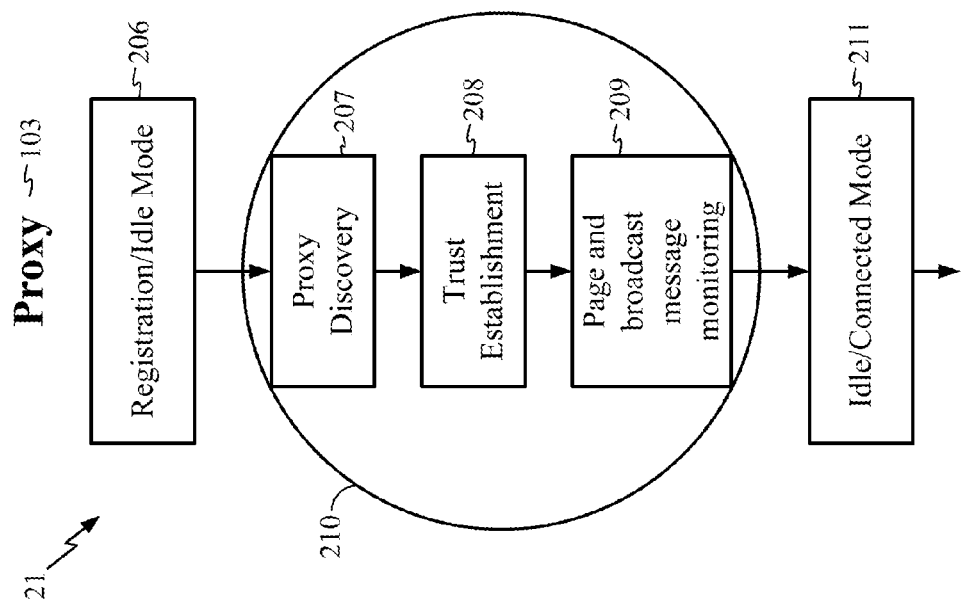
FIG. 2B is an operational flow diagram illustrating the general operational blocks in which the multiradio device operates as a proxy according to one embodiment of the present teachings.

FIG. 2B is an operational flow diagram illustrating the general operational blocks 21 in which the multiradio device 102 operates as a proxy according to one embodiment of the present teachings. The initial proxy state is the registration/idle mode operational block 206. In order to be available as a proxy server to clients of the wireless network 10 (FIG. 1), the potential proxy server, i.e., the multiradio device 102, registers itself with the wireless network 10 through the base station 101 (FIG. 1). The wireless network 10 generates lists of proxy servers that are available for use during the proxy discovery operational block 201 (FIG. 2A) for the client devices, such as the multiradio device 100 (FIG. 2A). Depending on the embodiment of the present teaching implemented in the wireless network 10, the proxy discovery operational block 207 of the multiradio device 102 may involve receiving a proxy request directly from the client device or receiving the proxy request from the wireless network 10. Once the request has been received, the multiradio device 102 enters into the trust establishment operational block 208, which operates in a manner similar to the trust establishment operational block 202 (FIG. 2A) for the client device.

After the requisite security has been established between the multiradio device 102 and its client device, the multiradio device 102 enters the page and broadcast message monitoring operational block 209. On entry to this operational block, if such identifiers were not already exchanged during the trust establishment operational block 208, the multiradio device 102 receives proxy page scheduling information that includes such data as one or more of the client's IDs/wireless wide area network (WWAN) identities, such as a temporary mobile subscriber identity (TMSI), a system TMSI (S-TMSI), an international mobile subscriber identity (IMSI), a system information radio network temporary identifier (SI-RNTI), a paging RNTI (P-RNTI), and the like. Proxy page scheduling information will also include the value tags of any of the latest acquired MIB/SIBs, if necessary and/or available. The multiradio device 102 will then signal the wireless network 10 (FIG. 1) that it has established an association with the client device and then transmit the deep sleep signal to the client. At the same time, the multiradio device 102 begins monitoring pages and the latest MIB/SIBs for the client. When the multiradio device 102 detects a page for the client, the multiradio device 102 transmits a signal waking up the client and delivering the latest MIB/SIBs and the page to the client.

It should be noted that in various additional and/or alternative embodiments of the present teachings, the multiradio device 102 may determine to send only the latest MIB/SIBs without the page. Moreover, once a proxy server, such as the multiradio device 102, is associated with a client device, the proxy transmits the tracking area and periodic registration updates to the wireless network 10 (FIG. 1) on the client's behalf as well.

It should further be noted that in additional and/or alternative embodiments of the present teachings, network parameters may be adjusted after the multiradio device 102 informs the network of the proxy association in order to better facilitate the proxy monitoring process. The wireless network 10 (FIG. 1) may change the number of page retransmissions, change the durations between transmissions of the same page, change the PO for the client, add new page types, and the like. These network parameters may be changed to make the multiradio device's proxy monitoring more efficient—especially when the multiradio device 102 acts as a proxy server for more than one client and/or the proxy server is power sensitive device. When the client/proxy association ends, or the short range link between the multiradio device 102 and its client is broken for some reason, the wireless network 10 may revert back to the original network parameters for that client.

Once the multiradio device 102 has detected a page signal and transferred the MIB/SIBs and page message to the client, and the client has exited the deep sleep to process and handle the page message and any incoming call or data message, the multiradio device 102 exits the proxy mode operation 210, which comprises the combination of the proxy discovery operational block 207, the trust establishment operational block 208, and the page and broadcast message monitoring operational block 209. The multiradio device 102 then enters the idle/connected mode operational block 211, waiting for any additional proxy requests.

As indicated in the examples described in FIGS. 2A and 2B, the idle state proxy mode operations for a proxy/client association are classified into three separate stages: (1) proxy discovery; (2) trust establishment; and (3) (a) monitoring page and broadcast messages for the proxy; and (b) entering a deep sleep mode for the client.

1. Proxy Discovery

In the first of these stages, proxy discovery, the client acquires a proxy list and proxy discovery schedule, and the client and proxy undergo the short range discovery process. The client may obtain the proxy discovery schedule from the network, or it may generate the schedule itself using various time and/or event-based triggers that it has access to. Various embodiments of the present teachings may accomplish proxy discovery in different manners. In network-assisted embodiments, the wireless network may provide the proxy lists and schedules through a dedicated message-based discovery, a broadcast message-based discovery, or a hybrid solution that combines the two.

Figure 3A:
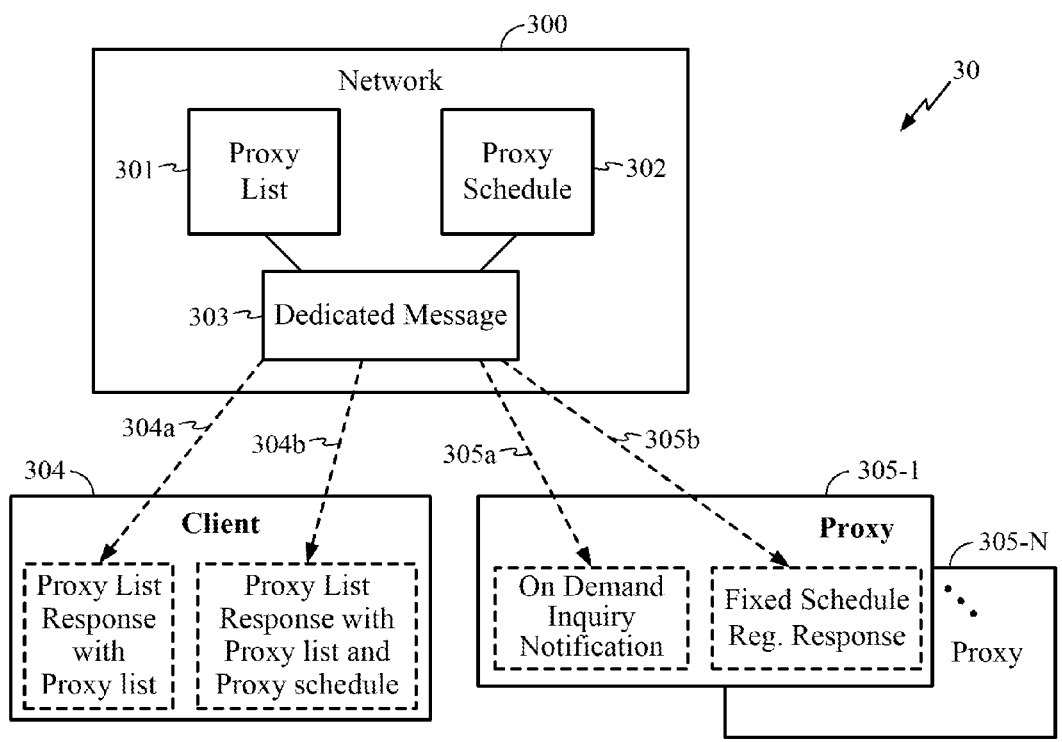
FIG. 3A is a block diagram illustrating a dedicated message-based discovery system configured according to one embodiment of the present teachings.

FIG. 3A is a block diagram illustrating a dedicated message-based discovery system 30 configured according to one embodiment of the present teachings. The network 300 maintains network information comprising at least the proxy list 301 and the proxy inquiry schedule 302. When a client, such as the client 304, desires to set up an association with a proxy, it transmits a proxy list request to the network 300. Depending on the particular embodiment implemented, the network 300 may respond in one of several different ways. In one embodiment, the network 300 generates a dedicated message 303 containing the proxy list 301. The network 300 then transmits communication 304a to the client 304 that includes the dedicated message 303, which contains the proxy list 301. In this embodiment, the client 304 will generate a proxy schedule list on its own using available information, such as time and/or event-based triggers. In an alternative embodiment, the network 300 generates the dedicated message 303 containing both the proxy list 301 and an inquiry schedule 302. The network 300 then transmits a communication 304b to the client 304 that includes the alternative embodiment of the dedicated message 303 which contains both the proxy list 301 and inquiry schedule 302.

In communications with the proxy devices 305-1-305-N, alternative embodiments of the described example of FIG. 3A also communicate using different information. For example, in one embodiment, the network 300 transmits a notification 305*a* to the proxies 305-1-305-N to enter into an inquiry/ inquiry scan mode. In an alternative embodiment of the described example of FIG. 3A, the network 300 transmits a fixed schedule 305*b* to the proxies 305-1-305-N along with the registration message delivered when the proxies 305-1- 305-N register with the network 300.

It should be noted that the proxies 305-1-305-N may comprise various network components in the network 300. For example, the proxies 305-1-305-N may be multiradio devices with access to a network server located within network 300. The network server implementation would provide processing for all or part of the various processes and functions of such embodiments of the present teachings and then signal the network servers to transmit the appropriate information to the client 304.

Figure 3B:
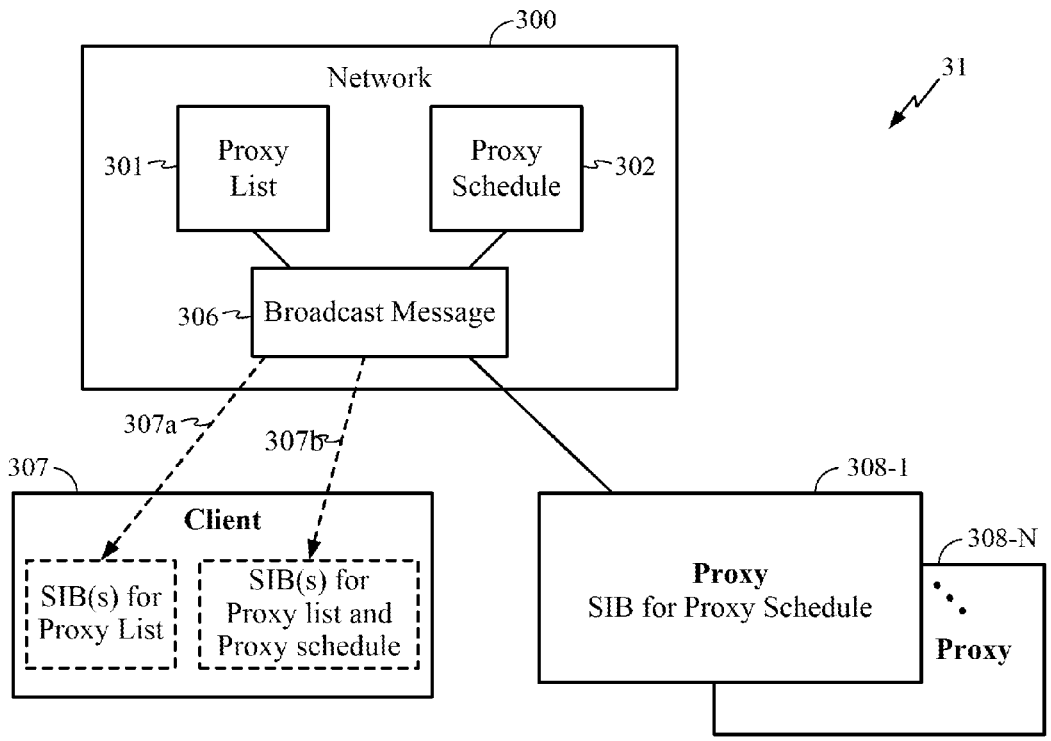
FIG. 3B is a block diagram illustrating a broadcast message-based discovery system configured according to one embodiment of the present teachings.

FIG. 3B is a block diagram illustrating a broadcast message-based discovery system 31 configured according to one embodiment of the present teachings. The network 300 maintains the proxy list 301 and proxy inquiry schedule 302, as in dedicated message-based discovery system 30 (FIG. 3A). However, when communicating one or both of the proxy list 301 and the proxy inquiry schedule 302, the network 300 uses dedicated broadcast messages. For example, in a first embodiment, the network 300 generates the broadcast message 306 containing only the SIB(s) for the proxy list 301. The network 300 then transmits communication 307*a* to the client 307 that includes the broadcast message 306, which contains the SIB(s) for the proxy list 301. In this embodiment, the client 307 will generate a proxy schedule list on its own using available information, such as time and/or event-based triggers. In an alternative embodiment, the network 300 generates the broadcast message 306 containing both the SIB(s) for the proxy list 301 and the inquiry schedule 302. The network 300 then transmits a communication 307*b* to the client 307 that includes the alternative embodiment of the broadcast message 306 which contains both the SIB(s) for the proxy list 301 and inquiry schedule 302. When proxies, such as the proxies 308-1-308-N, move into or out of the TA/LA, and registration data updates become necessary due to the expiration of the TA/LA update timers, or the UE TA/LA changes, the proxy list 301 is updated with new TA/LA data which is included in subsequent broadcast messages 306. Thus, as the client 307 receives the subsequent broadcast messages 306, it updates the proxy list and any other data it has that needs updating. As the proxies 308-1-308-N receive and process the broadcast messages 306, they extract the proxy inquiry schedule 302 for their proxy operations.

Figure 3C:
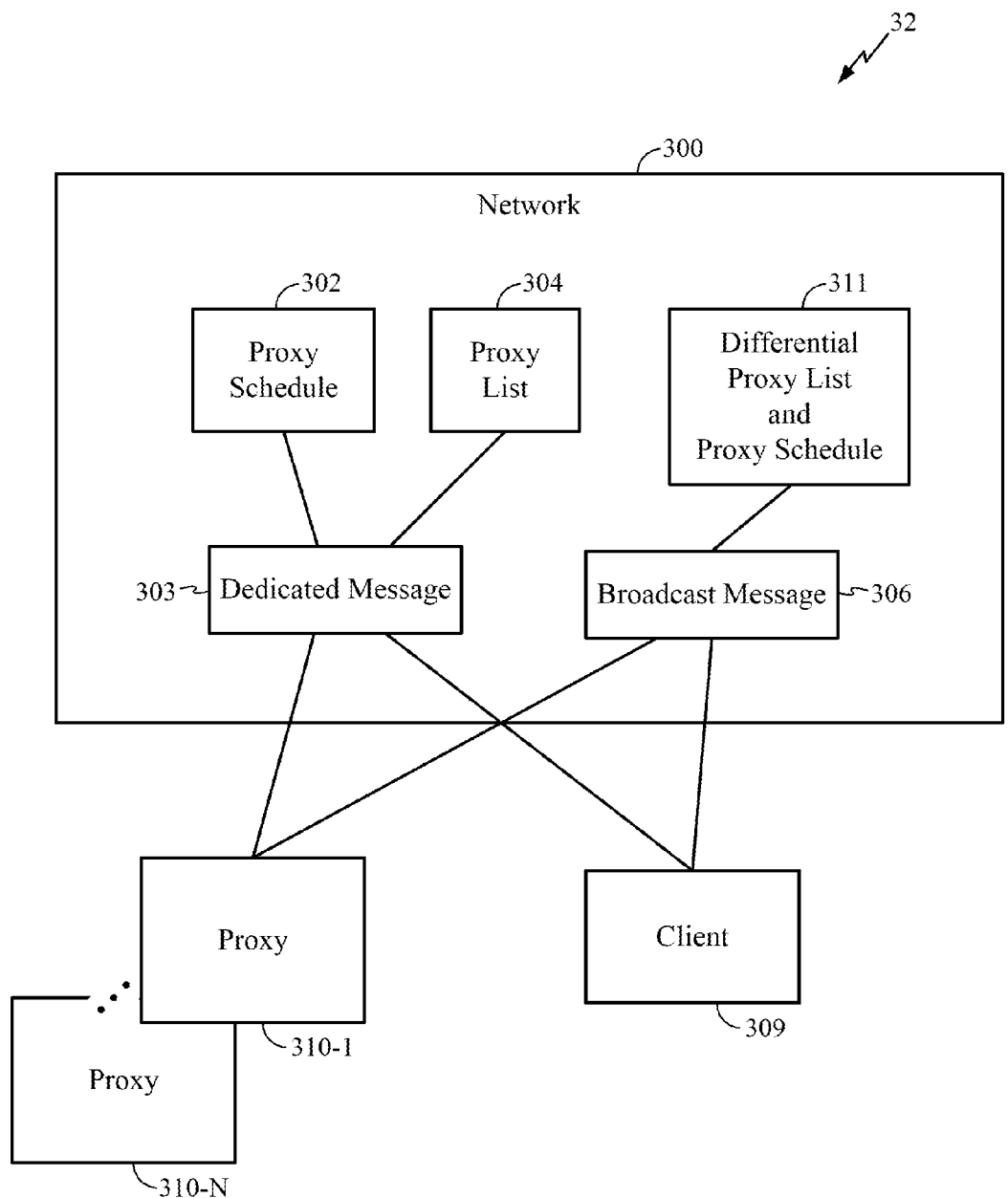
FIG. 3C is a block diagram illustrating a hybrid message-based discovery system configured according to one embodiment of the present teachings.

The described embodiments of FIGS. 3A and 3B illustrate an example discovery system that relies on direct network messages and an example discovery system that relies on broadcast network messages to deliver or prompt receipt of the proxy list and proxy inquiry schedule for the client and proxy. FIG. 3C is a block diagram illustrating a hybrid message-based discovery system 32 configured according to one embodiment of the present teachings. As with the dedicated message-based discovery system 30 (FIG. 3A) and the broadcast message-based discovery system 31 (FIG. 3B), the hybrid message-based discovery system 32 maintains the proxy list 301 and proxy inquiry schedule 302. For the initial proxy discovery, a direct message process is used. The client 309 requests the proxy list 301 from the network 300. The network 300 sends the proxy list 301 directly to the client 309. The proxies 310-1-310-N, as described with the dedicated message-based discovery system 30, may obtain the inquiry schedule either by receiving a notification from the network 300 to enter into an inquiry/inquiry scan mode to detect the inquiry schedule itself, or may receive a fixed schedule from the network 300 in a response registration message when the proxies 310-1-310-N initially register with the network 300. For subsequent proxy discovery, however, the network 300 generates a proxy list differential 311, which identifies any changes in the proxy list 301 from the previous version. The network 300 attaches this proxy list differential 311 to a broadcast message 306 and broadcasts the message over the network to client 309 and proxies 310-1-310-N. The client 309 and proxies 310-1-310-N will receive and process these broadcast messages 306 and use the information in the proxy list differential 311 to update the proxy list that they maintain locally.

Figure 3D:
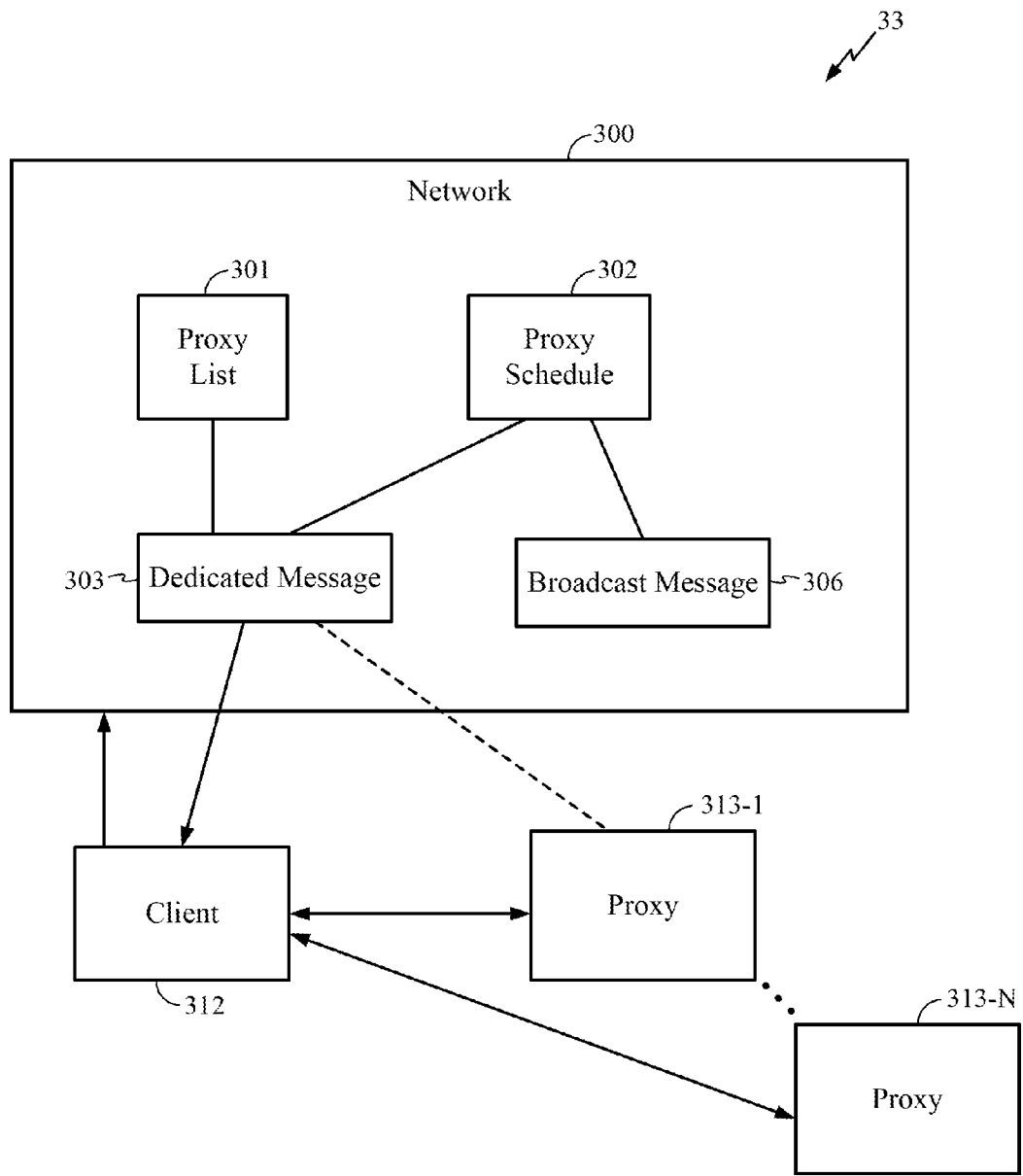
FIG. 3D is a block diagram illustrating a self-discovery system configured according to one embodiment of the present teachings.

In addition to the network-assisted discovery systems, in which the network provides the proxy list to the client either through a dedicated message or a broadcast message, embodiments of the present teachings also include self-discovery systems. FIG. 3D is a block diagram illustrating a self-discovery system 33 configured according to one embodiment of the present teachings. Here again, the network 300 maintains the proxy list 301 and the proxy inquiry schedule 302. However, the client 312 performs a scan for any and all short range wireless devices in its vicinity. Some of these devices may be capable of operating as a proxy on the network 300, while others may simply be short range wireless devices without any ability to connect to the network 300. The client 312 generates an initial list of devices that it discovers and sends that list to the network 300. The network 300 receives and processes the initial list of devices comparing the devices on that initial list to the proxy list 301. The network 300 then generates a dedicated message 303 that includes the intersection set of proxies found on both lists. The network 300 then transmits the dedicated message 303 to the client 312.

Depending on the embodiment implemented in the network 300, the proxies 313-1-313-N either obtain the proxy inquiry schedule 302 via a broadcast message 306 or, after receiving a notification from the network 300 with dedicated message 303, and then enter into an inquiry/inquiry scan mode to detect or be detected by the client 312.

Figure 4A:
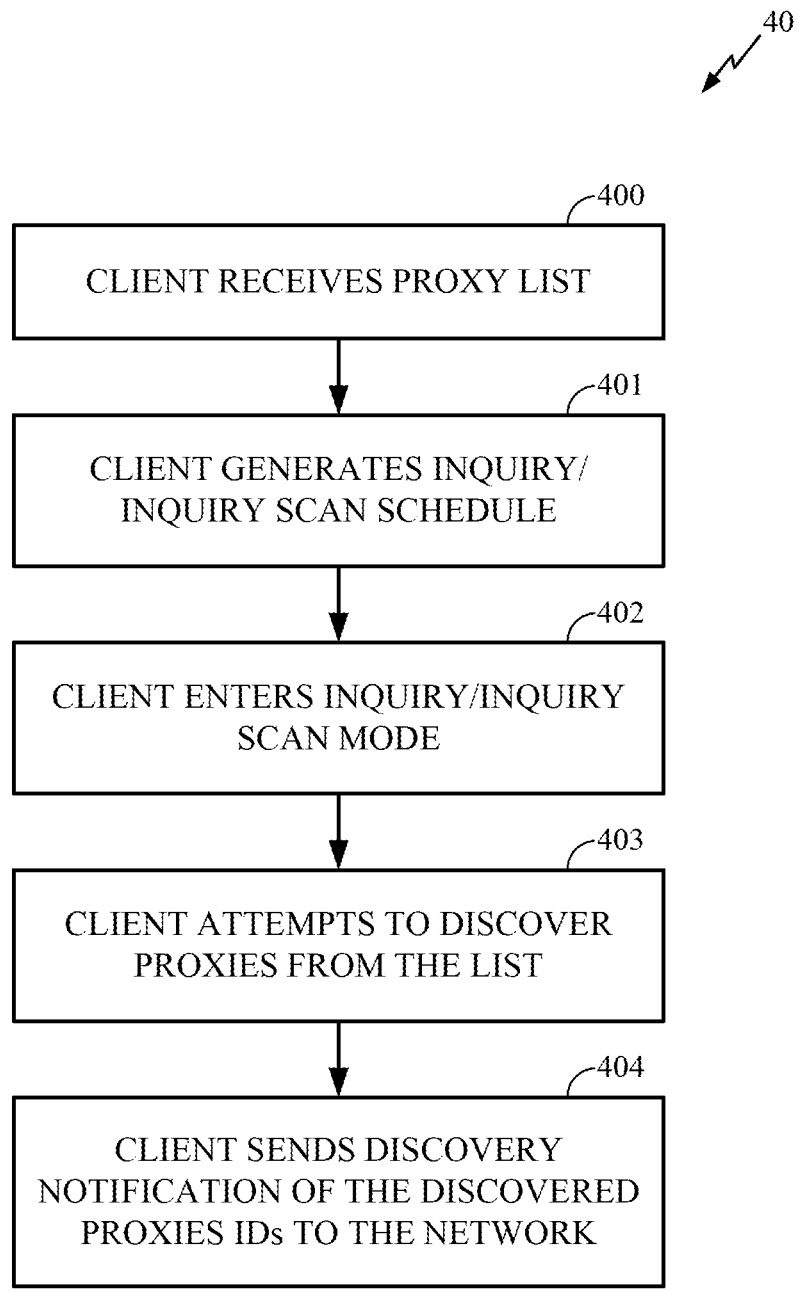
FIG. 4A is an operational flow diagram illustrating operational blocks for a short range proxy discovery system configured according to one embodiment of the present teachings.

Short range proxy discovery is a final step to the proxy discovery process shared by each of the example discovery systems illustrated in FIGS. 3A-3C. Actually discovering the proxies over the short range protocol may be accomplished in several alternative ways. FIG. 4A is an operational flow diagram illustrating operational blocks for a short range proxy discovery system 40 configured according to one embodiment of the present teachings. In block 400, the client receives the proxy list from the network. Once the proxy list is received, in block 401, the client generates an inquiry/inquiry scan schedule associated with the proxy list. The client attempts to discover proxies from the list, in block 402, by entering an inquiry/inquiry scan mode. In the first part of the inquiry/inquiry scan mode, the client enters a probe mode, attempting to discover the proxies, in block 403, by transmitting inquiry probe packets to the proxies on the list. Inquiry probe packets are initial identification messages that are directed at the proxies on the list and include return address or identification data for the transmitting client. When the client receives response probe packets from available ones of the proxies on the list, it sends a discovery notification of the discovered proxies' IDs to the network in block 404.

Figure 4B:
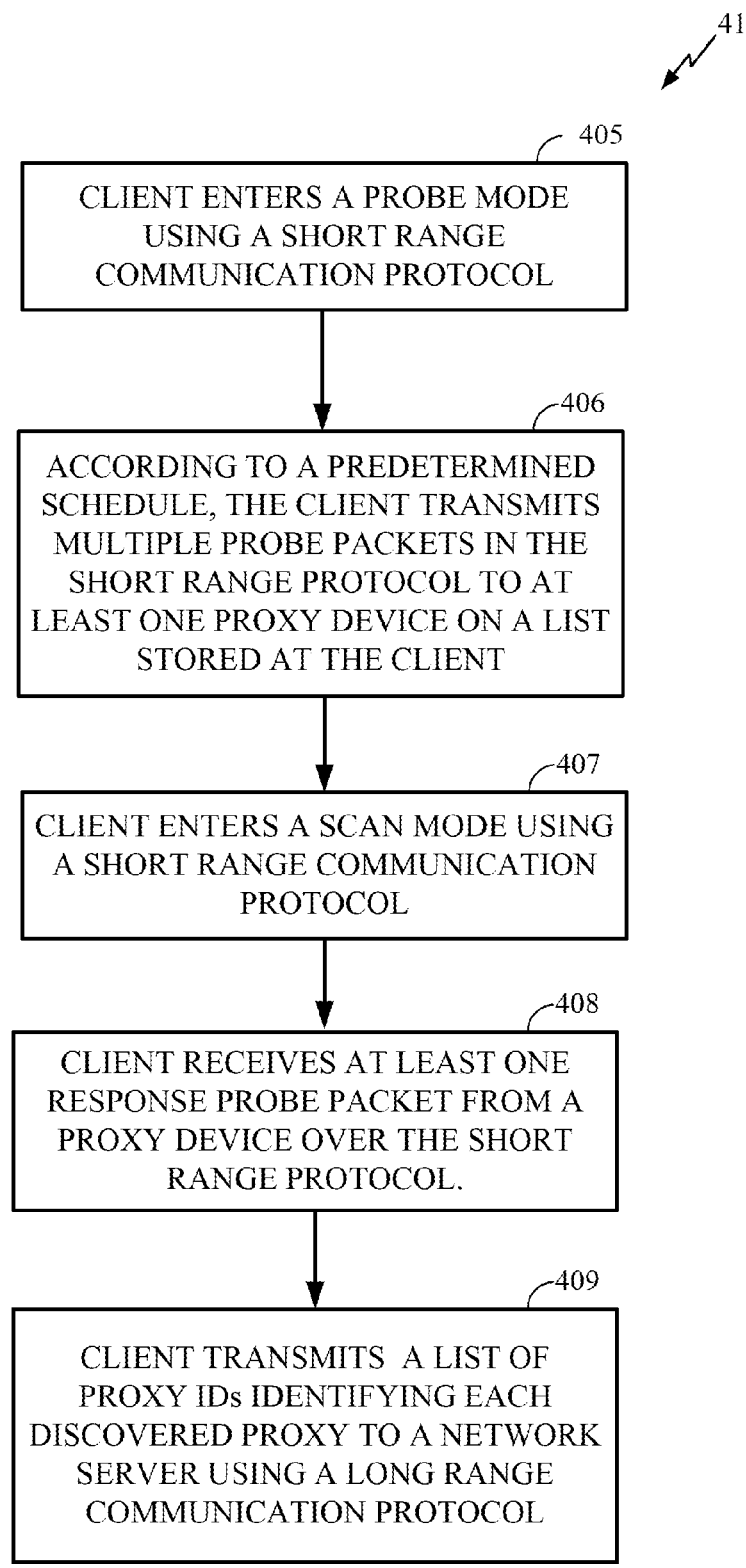
FIG. 4B is an operational flow diagram illustrating operational blocks for a short range proxy discovery system configured according to one embodiment of the present teachings.

FIG. 4B is an operational flow diagram illustrating operational blocks for a short range proxy discovery system 41 configured according to one embodiment of the present teachings. In block 405, a client enters a probe mode using a short range communication protocol. The client transmits multiple probe packets in the short range protocol, in block 406, to at least one proxy device on a list stored at the client. The client transmits these probe packet on a predetermined schedule. In block 407, the client enters a scan mode using the short range communication protocol. The client receives at least one response probe packet from one of the proxy devices over the short range protocol, in block 408. In block 409, the client transmits a list of proxy IDs identifying each discovered proxy to a network server using a long range communication protocol.

Figure 4C:
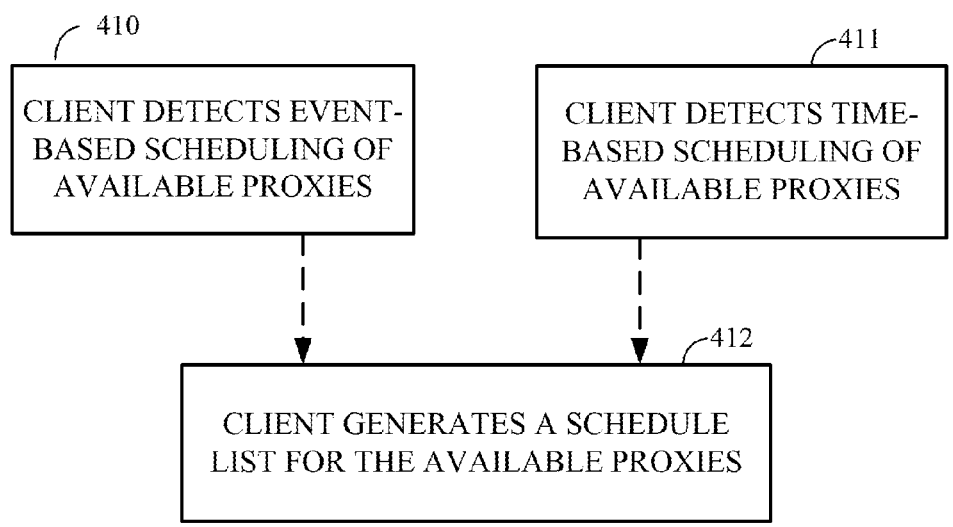
FIG. 4C is an operational flow diagram illustrating operational blocks operable in short range proxy discovery systems configured according to one embodiment of the present teachings.

FIG. 4C is an operational flow diagram illustrating operational blocks operable in short range proxy discovery systems 40 and 41 configured according to one embodiment of the present teachings. In selected embodiments, a client device may obtain a list of schedules for the available proxies from the network in a broadcast message or a direct message. However, in additional embodiments, the client device itself may generate such a schedule list based on information that it can directly obtain. In block 410, a client detects any event-based scheduling of available proxies. The client detects time-based scheduling of the available proxies, in block 411. Blocks 410 and 411 are shown with dotted lines into block 412 because the client may detect one or the other, or both. In block 412, the client generates a schedule list for the available proxies.

Figure 5:
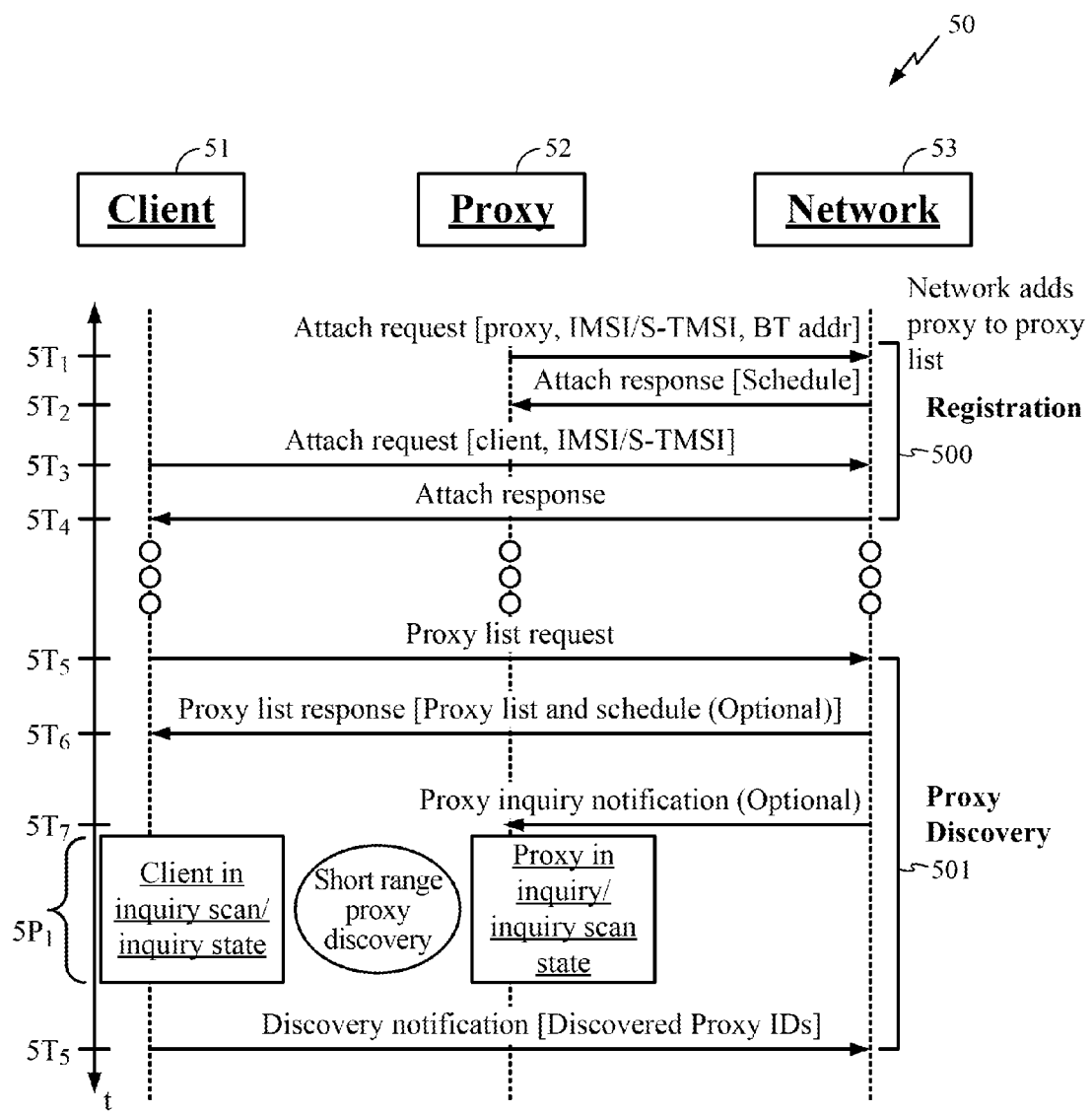
FIG. 5, a message flow diagram illustrates the messaging that occurs between the client, proxy, and the network during a dedicated message-based discovery system configured according to one embodiment of the present teachings.

Turning now to FIG. 5, a message flow diagram 50 illustrates the messaging that occurs between the client 51, proxy 52, and the network 53 during a dedicated message-based discovery system configured according to one embodiment of the present teachings. The message flow diagram 50 begins with registration 500 of the client 51 and the proxy 52. At time $5T_1$, the proxy 52 transmits an attach request to the network 53. The attach request includes the proxy's identifications and addresses, such as, for example, its IMSI/S-TMSI, short range protocol address, or other various types of client identifiers. The network 53 sends an attach response back to the proxy 52 at time $5T_2$ that includes the proxy inquiry schedule and a certificate that provides authentication verification for operating within the network 53. The client 51 enters the network 53 at time $5T_3$ and sends an attach request to the network 53. The client attach request includes the client's identifications, such as, for example, its IMSI/S-TMSI, short range protocol address, or other various types of client identifiers. At time $5T_4$, the network 53 sends an attach response verifying registration with the network.

After the registration 500 of the client 51 and the proxy 52, the proxy discovery process 501 begins, at time $5T_5$, with a proxy list request transmitted by the client 51. At time $5T_6$, the network 53 transmits a proxy list response that includes an authentication certificate, the proxy list, and the proxy inquiry schedule. During period $5P_1$, the client 51 enters into an inquiry scan/inquiry state and attempts to discover the short range proxies on the proxy list through the transmission and receipt of probe packets in the probe and scan modes. At time $5T_8$, the client 51 transmits a discovery notification that includes the IDs of the discovered proxies.

It should be noted that in additional and/or alternative embodiments of the present teachings, the network 53 may send only a certificate with its attach response sent to the proxy 52 at time $5T_2$. Instead, at time $5T_7$, the network 53 would send a notification signal to the proxy 52 that prompts the proxy 52 to enter into an inquiry/inquiry scan state during the period $5P_1$ for discovering the inquiry schedule.

Figure 6:
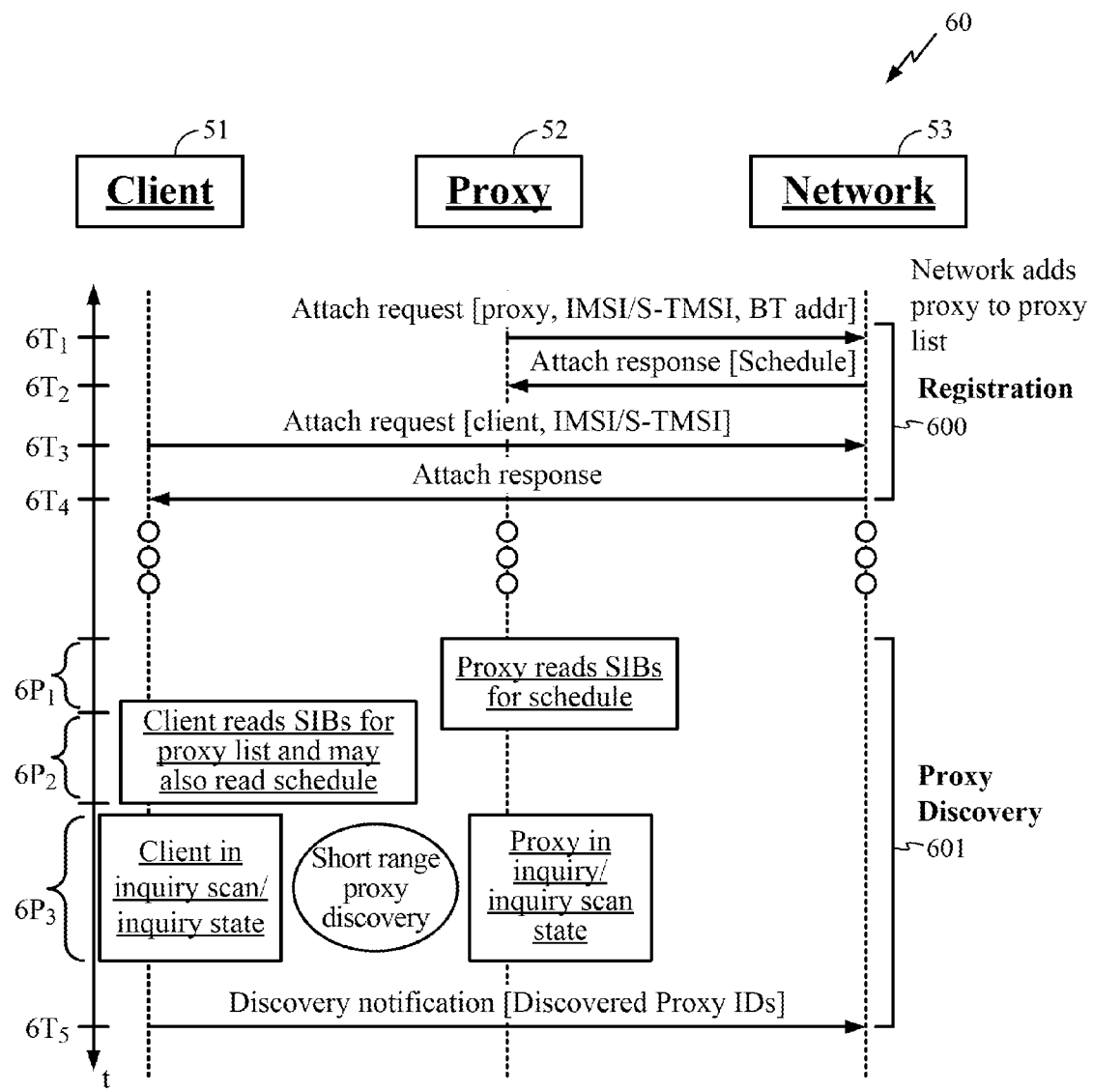
FIG. 6 is a message flow diagram illustrating the messaging that occurs between the client, the proxy, and the network in a broadcast message-based discovery system configured according to one embodiment of the present teachings.

FIG. 6 is a message flow diagram 60 illustrating the messaging that occurs between the client 51, the proxy 52, and the network 53 in a broadcast message-based discovery system configured according to one embodiment of the present teachings. The message flow diagram 60 begins with registration 600 of the client 51 and proxy 52. At time $6T_1$, the proxy 52 transmits an attach request to the network 53. The attach request includes the proxy's IDs. At time $6T_2$, the network 53 sends an attach response to the proxy 52 that includes an authentication certificate. At time $6T_3$, the client 51 sends an attach request to the network 53 with its own IDs. The network 53 responds, at time $6T_4$ with an attach response verifying the registration of the client 51.

The proxy discovery process 601 begins with the start of period $6P_1$, during which the proxy 52 reads and processes SIBs broadcast from the network 53. The SIBs contain the proxy inquiry schedule for the system. At period $6P_2$, the client 51 also reads and processes SIBs. In addition to containing the proxy inquiry schedule, the broadcast SIBs also contain the proxy list. The client 51 obtains the most recent proxy list from the SIBs. During period $6P_3$, the client 51 enters into an inquiry scan/inquiry state attempting to discover the short range proxies on the proxy list. Similarly, the proxy 52 enters into an inquiry/inquiry scan state based on the inquiry schedule obtained from the SIBs. At time $6T_5$, the client 51 transmits the discovery notification to the network 53 including all of the IDs for the discovered proxies.

Figure 7:
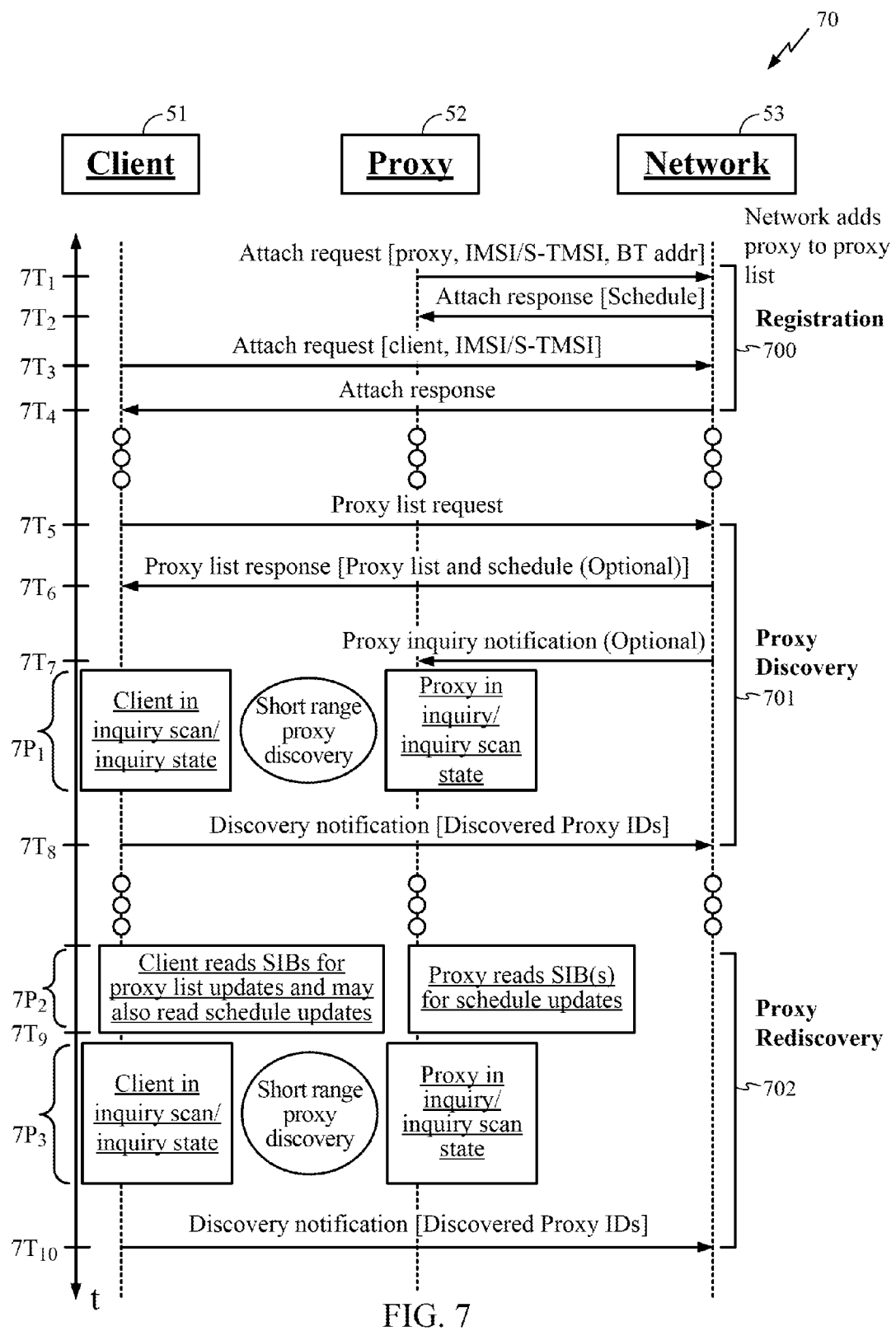
FIG. 7 is a message flow diagram illustrating the messaging that occurs between the client, the proxy, and the network in a hybrid message-based discovery system configured according to one embodiment of the present teachings.

FIG. 7 is a message flow diagram 70 illustrating the messaging that occurs between the client 51, the proxy 52, and the network 53 in a hybrid message-based discovery system configured according to one embodiment of the present teachings. The message flow diagram 70 begins with registration 700. At time $7T_1$, the proxy 52 sends an attach request containing its IDs to the network 53. At time $7T_2$, the network 53 sends an attach response to the proxy 52. The attach response includes an authentication certificate and a proxy inquiry schedule. At time $7T_3$, the client 51 transmits an attach request including its IDs to the network 53. The network 53 responds to this request by sending an attach response to the client 51 at time $7T_4$ confirming registration in the system.

After registration 700, a proxy discovery process 701 begins at time $7T_5$ by sending a proxy list request to the network 53. The network 73 uses a dedicated message to transmit the proxy list back to the client 51 at time $7T_6$. The proxy list response also includes an authentication certificate and a schedule. During period $7P_1$, the client 51 enters into an inquiry scan/inquiry state attempting to discover all of the short range proxies listed on the proxy list. After the client 51 discovers such proxies, it transmits a discovery notification to the network 53 at time $7T_8$ that includes the IDs of all of the discovered proxies.

As proxies move in and out of the cell/tracking area, the proxy list is updated, and the message flow diagram 70 enters the proxy re-discovery period 702. The client 51 obtains updates to the proxy list through broadcast messages transmitted from the network 53. The network 53 broadcasts SIBs that include both the updates to the proxy list and the most recent proxy inquiry schedule. When the client 51 attempts to re-discover the proxies, it reads the SIBs for proxy list updates and, in some embodiments, will also read for any schedule updates, during period $7P_2$ and extracts the schedule and/or proxy list updates. The proxy 52 will also read through the SIBs for any schedule updates, during period $7P_2$. Depending on the embodiment implemented in the network 53, the proxy list updates may comprise a full proxy list or just the list differential. After the client 51 has obtained the updates to the proxy list, it will again enter into the inquiry scan/inquiry state during period $7P_3$ to discover the short range proxies on the updated list. At time $7T_{10}$, the client 51 transmits a new discovery notification to the network 53 that includes the IDs of all of the newly discovered proxies.

It should be noted that in additional and/or alternative embodiments of the present teachings, instead of the proxy 52 obtaining the proxy inquiry schedule through the attach response during registration 700, a proxy inquiry notification is transmitted from the network 53 to the proxy 52 at times $7T_7$ and again for the re-discovery period 702 at time $7T_9$. The proxy inquiry notification prompts the proxy 52 to enter into the proxy inquiry/inquiry scan state for detecting the inquiry scheduling of the client 51.

Figure 8:
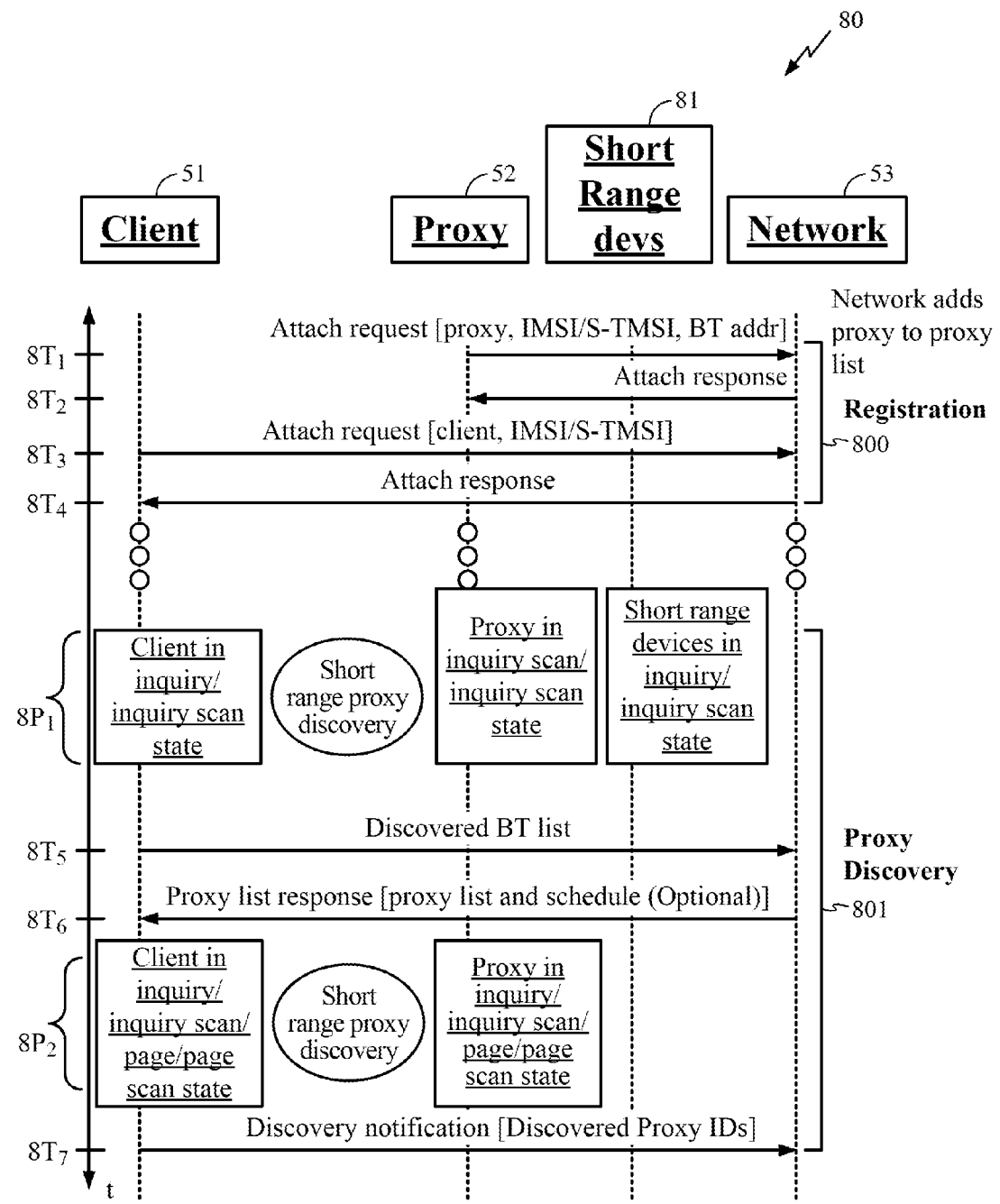
FIG. 8 is a message flow diagram illustrating the messaging that occurs between the client, short range devices, the network, and the proxy in a self-discovery system configured according to one embodiment of the present teachings.

FIG. 8 is a message flow diagram 80 illustrating the messaging that occurs between the client 51, short range devices 81, the network 53, and the proxy 52 in a self-discovery system configured according to one embodiment of the present teachings. The message flow diagram 80 begins with registration 800. At time $8T_1$, the proxy 52 registers with the network 53 by sending an attach request with its ID information to the network 53. At time $8T_2$, the network 53 sends its attach response with an authentication certificate to proxy 52. At time $8T_3$, the client 51 registers with the network 53 by sending its own attach request along with its ID information to the network 53. The network 53 responds, acknowledging the client's 51 registration, by sending an attach response message to the client 51 at time $8T_4$.

The beginning of period $8P_1$ indicates the message flow diagram 80 entering the proxy discovery process 801. During period $8P_1$, the client 51 enters into an inquiry state to discover the available short range devices 81 within its wireless proximity. The proxy 52 enters into an inquiry scan state with the short range device entering an inquiry state to respond to any of the client's discovery scans. At time $8T_5$, the client 51 transmits its initial device list to the network 53. The initial device list contains all of the compatible devices, including the proxy 52 and short range devices 81. The network 53 compares the devices on the initial device list to the proxies found in the proxy list maintained by the network 53. The network 53 generates a targeted proxy list and transmits that list to the client 51 at time $8T_6$. The target proxy list contains the devices from the initial device list that are also found on the proxy list maintained by the network 53.

Using the targeted proxy list of devices which was narrowed from the initial device list, the client 51 enters into the inquiry scan/inquiry state during period $8P_2$ in order to discover all of the short range proxies on that targeted list. The proxy 52 also enters into the inquiry/inquiry scan state to communicate with the discovery attempts of the client 51. At time $8T_7$, the client 51 transmits a discovery notification that includes the IDs of each of the discovered proxies.

2. Trust Establishment

Figure 9:
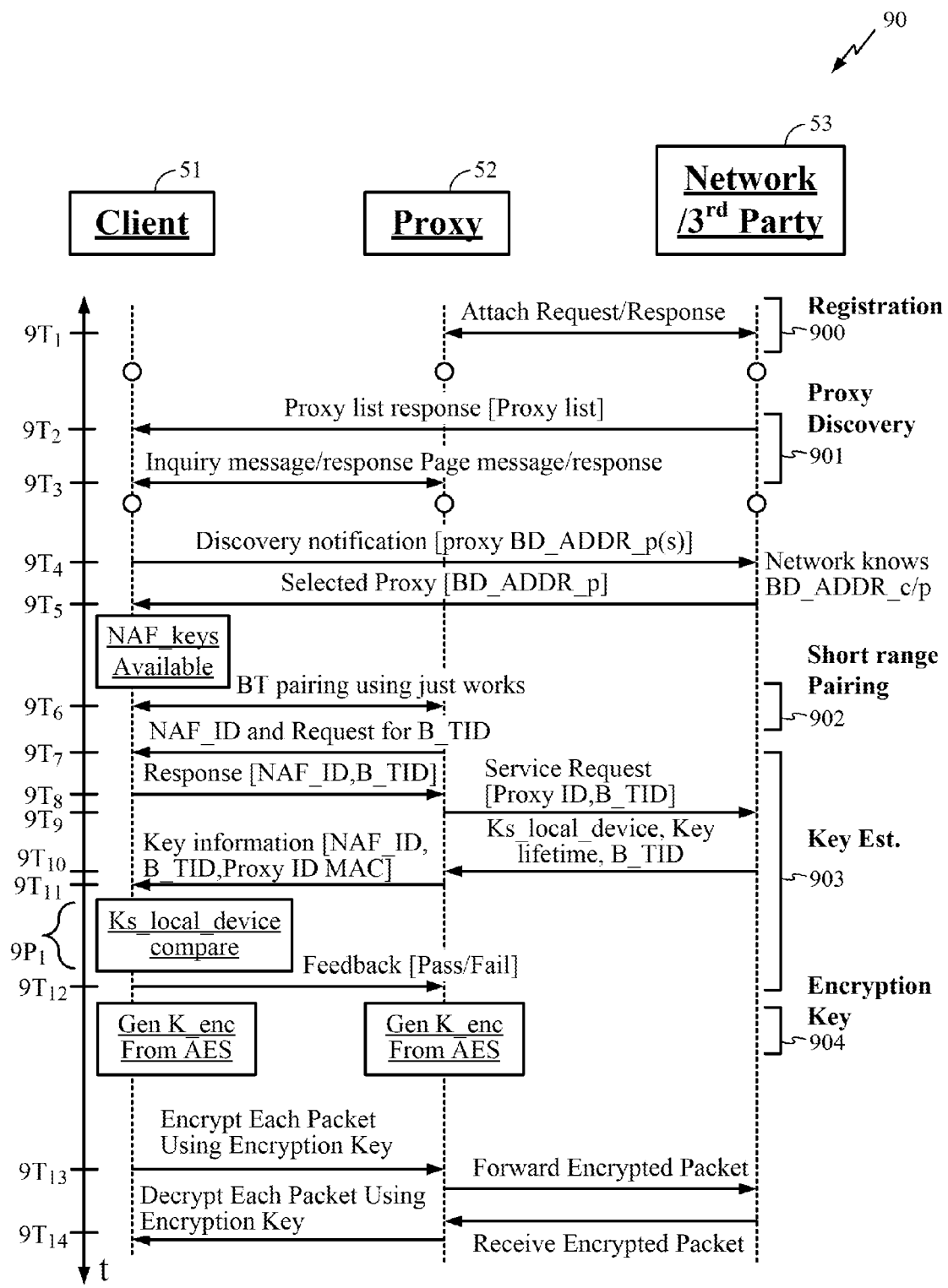
FIG. 9 is a message flow diagram illustrating the messaging exchanged between client, proxy, and network for establishing a secure trust relationship according to one embodiment of the present teachings.

FIG. 9 is a message flow diagram 90 illustrating the messaging exchanged between client 51, proxy 52, and network 53 for establishing a secure trust relationship according to one embodiment of the present teachings. The message flow diagram 90 begins with registration 900. At time $9T_1$, the proxy 52 sends an attach request to the network 53, which responds with an attach response verifying registration. The proxy discovery process 901 proceeds at time $9T_2$ as the network 53 transmits a proxy list to the client 51. At time $9T_3$, the client 51 and the proxy 52 discover one another. The client 51 sends a discovery notification to the network 53 at time $9T_4$ that includes the IDs of each of the proxies, including the proxy 52, that it detected. At time $9T_5$, the network 53 transmits the address of the selected proxy, the proxy 52, to the client 51.

Once the client 51 has the specific address of the selected proxy, a short range pairing 902 begins at time $9T_6$ by the client 51 and the proxy 52 transmitting and responding using the messaging provided for in the short range protocol. Having been paired and connected using the short range protocol, network application function (NAF) IDs are available to both the client 51 and the proxy 52. Key establishment 903 begins at time $9T_7$ when the client 51 receives a request with a NAF ID from the proxy 52 for obtaining B_TID. The client 51 responds at time $9T_8$ sending a response that includes the NAF ID and the B_TID to the proxy 52. At time $9T_9$, the proxy 52 transmits a service request to the network 53 that includes the proxy's proxy ID and the B_TID. Using this information, the network 53 derives a local device key and transmits the local device key at time $9T_{10}$ to the proxy 52 along with a key lifetime and the client's short range ID. The proxy 52 then sends the key information consisting of the NAF ID, B_TID and a message authentication code (MAC) derived from the local device key to the client 51 at time $9T_{11}$. The client 51 extracts the local device key from the key information received from the proxy, compares it with its own local device key and transmits a feedback signal (i.e., pass or fail) to the proxy 52 at time $9T_{12}$. Once the local device key has been validated between the client 51 and the proxy 52, the encryption key generation process 904 takes place in which the encryption key is generated from the input of the local device key in an AES encryption procedure. This resulting AES encryption key is then used to encrypt all messages transmitted between the client 51 and the proxy 52.

Trust establishment according to the example embodiment illustrated in FIG. 9 creates an application-based security that provides application layer security via the AES encryption key in addition to any link level encryption that could be provided by the short range protocol, such as the link level encryption offered through BLUETOOTH™. It should be noted, however, that additional and/or alternative embodiments of the present teachings would not require such high security standards or the complexity of the various additional servers or server functionality, such as with bootstrapping server function (BSF) and NAF used in implementing the application-based security.

It should be noted that the messages exchanged between proxy 52 and network 53 may be exchanged using any number of different communication media, such as via wireline links, other wireless links, and the like. The various embodiments of the present teachings are not restricted to any single communication media for the establishment of trust between proxies and an associated network.

Figure 10:
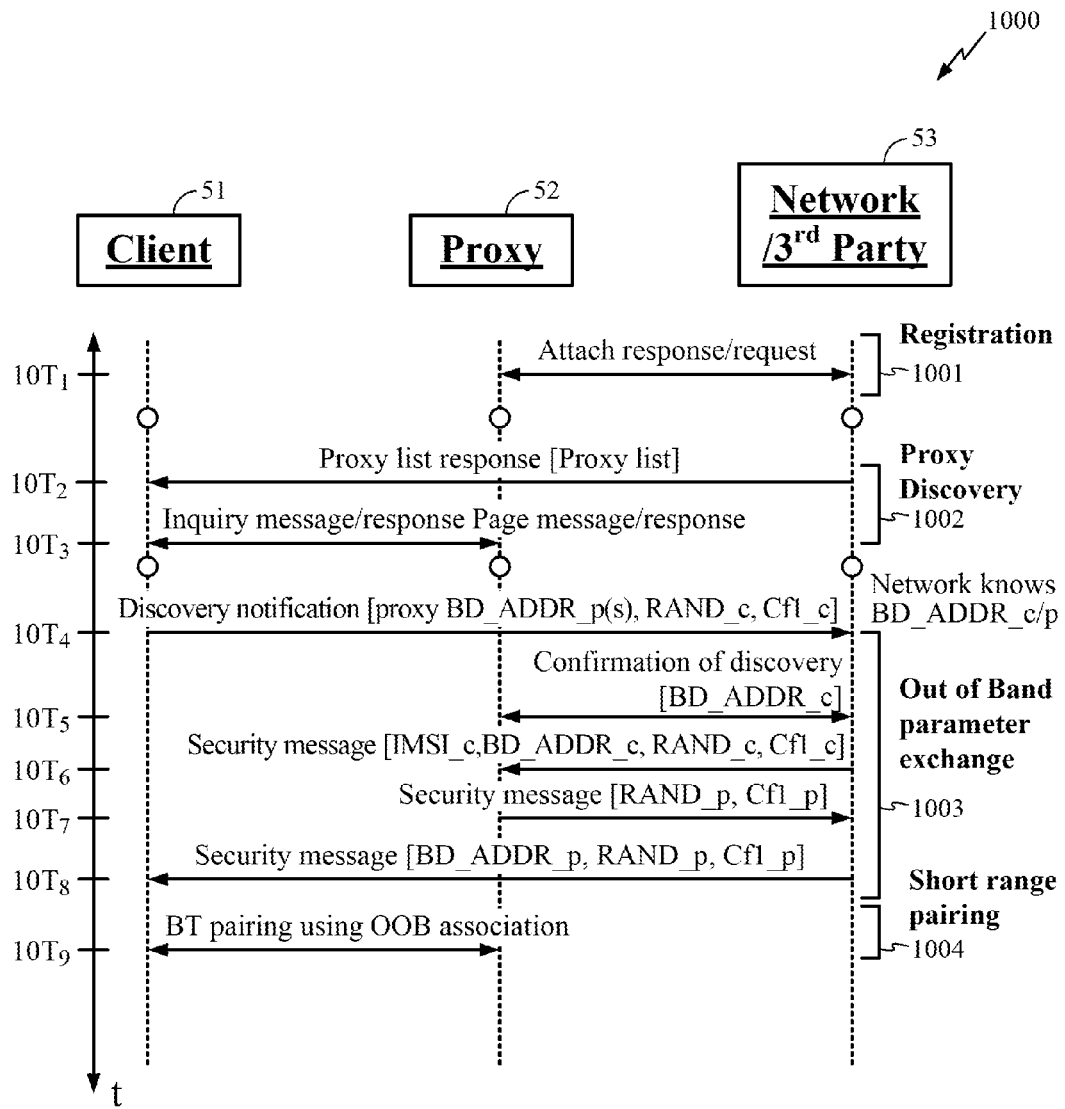
FIG. 10 is a message flow diagram illustrating the messaging exchanged between client, proxy, and network for establishing a secure trust relationship according to one embodiment of the present teachings.

FIG. 10 is a message flow diagram 1000 illustrating the messaging exchanged between client 51, proxy 52, and network 53 for establishing a secure trust relationship according to one embodiment of the present teachings. The message flow diagram 1000 begins with registration 1001. At time $10T_1$, the proxy 52 and the network 53 exchange registration attach request/response messages. The proxy discovery process 1002 begins at time $10T_2$ when the proxy list is transmitted to the client 51. At time $10T_3$, the client 51 and the proxy 52 exchange the inquiry message/response and the page message/response. The following out-of-band parameter exchange 1003 is based on short range protocol out-of-band security, such as the out-of-band security system offered in BLUETOOTH™. This type of out-of-band security involves the exchange of security parameters and identities using a more secure WWAN or third party network.

At time $10T_4$, the client 51 transmits the discovery notification, which includes the IDs of each of the discovered proxies along with a random number generated by the client 51 to the network 53. This transmission of the discovery notification is performed out of the short range protocol band, such as through a WWAN or other third party network. At time $10T_5$, discovery is confirmed through the exchange of out-of-band messages between the proxy 52 and the network 53. The confirmation messages between the proxy 52 and the network 53 include the short range protocol address of the client, such as the BLUETOOTH™ address. At time $10T_6$, the network 53 sends an out-of-band security message to the proxy 52 that includes the client 51 identities, such as the IMSI, the client short range protocol addresses, and the random number generated by the client 51, among other parameters. The proxy 52 then transmits an out-of-band security message to the network 53 at time $10T_7$ including at least a random number generated by the proxy 52. The network 53 then sends an out-of-band security message to the client 51 at time $10T_8$ including at least the short range address and random number generated by the proxy 52. The short range protocol pairing 1004 occurs at time $10T_9$ by messages exchanged within the short range band using the parameters that were exchanged out-of-band in the out-of-band parameter exchange 1003. With the pairing complete, the security has been established between the client 51 and the proxy 52.

3. Monitoring of Page and Broadcast Messages/Deep Sleep

Figure 11:
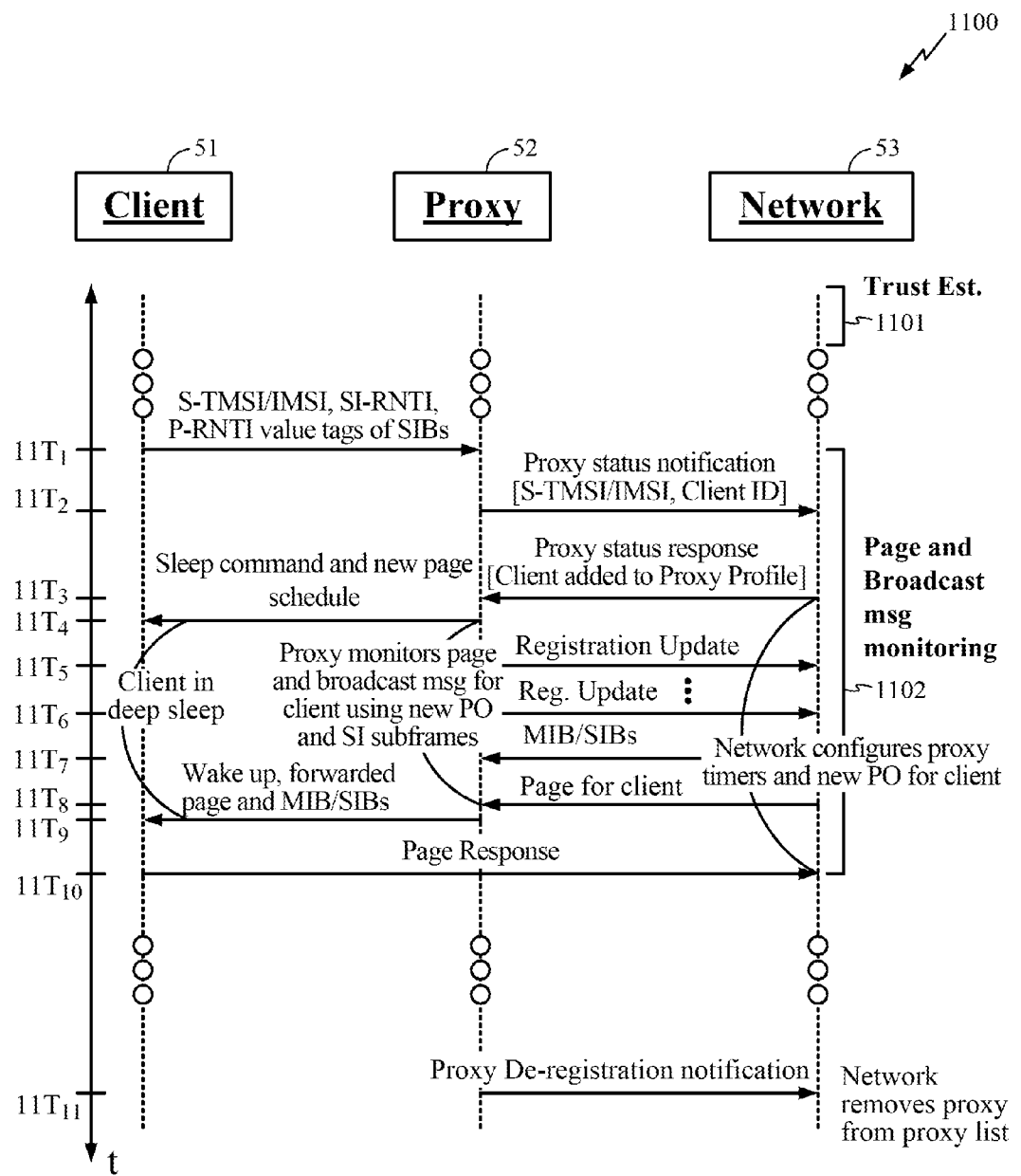
FIG. 11 is a message flow diagram illustrating the messaging that occurs between the client, proxy, and network in a proxy monitoring process configured according to one embodiment of the present teachings.

Once the trust establishment has been completed between the client and the proxy, the proxy begins monitoring for page and broadcast messaging on behalf of the client, while the client enters into a power saving deep sleep. FIG. 11 is a message flow diagram 1100 illustrating the messaging that occurs between the client 51, the proxy 52, and the network 53 in a proxy monitoring process configured according to one embodiment of the present teachings. At time $11T_1$, the trust establishment phase 1101 is completed, and the client 51 sends a message containing its IDs, S-TMSI/IMSI, SI-RNTI, P-RNTI, and the like, and value tags of its SIBs, to the proxy 52. This ID message at time $11T_1$ begins the page and broadcast message monitoring phase 1102. The proxy 52 transmits a proxy status notification to the network 53 at time $11T_2$, in which the notification contains the client IDs from the proxy page scheduling information and an indication that the proxy relationship has begun. Upon receiving this proxy status notification, the network 53 adds the client 51 to its proxy profile and sends a proxy status response message to the proxy 52 at time $11T_3$ verifying the proxy status. At time $11T_4$, the proxy 52 issues a sleep command to the client 51 prompting the client 51 to enter a deep sleep.

After receiving the proxy status notification from the proxy 52 at time $11T_2$, the network 53 reconfigures the proxy timers and establishes a new PO for the client. The proxy 52 uses this new PO to monitor the page and broadcast messages for the client 51. During the page and broadcast message monitoring phase 1102, the proxy 52 also sends proxy updates, such as periodic TA/LA updates, at times $11T_5$ and $11T_6$ to the network 53 when such updates may be necessary or useful. The network 53 expects to receive such registration updates during normal operation.

At time $11T_7$, the network 53 transmits the latest updated broadcast messages, such as the MIB/SIBs. A paging message for the client 51 is then transmitted from the network 53 at time $11T_8$ which is detected by the proxy 52. The proxy 52 forwards the page message and the latest MIB/SIBs to the client 51 at time $11T_9$. The forwarded page wakes the client 51 from its deep sleep. The client 51 then transmits its page response message at time $11T_{10}$ to the network 53. The page message may result in the client 51 leaving the idle state for an active mode to handle an incoming call or other incoming data message. If, for any reason, the proxy 52 intentionally leaves the network 53, a proxy de-registration notification is sent at time $11T_{11}$ by the proxy 52 to the network 53. The network 53 will then update its proxy list to reflect the removal of the proxy 52.

Figure 12:
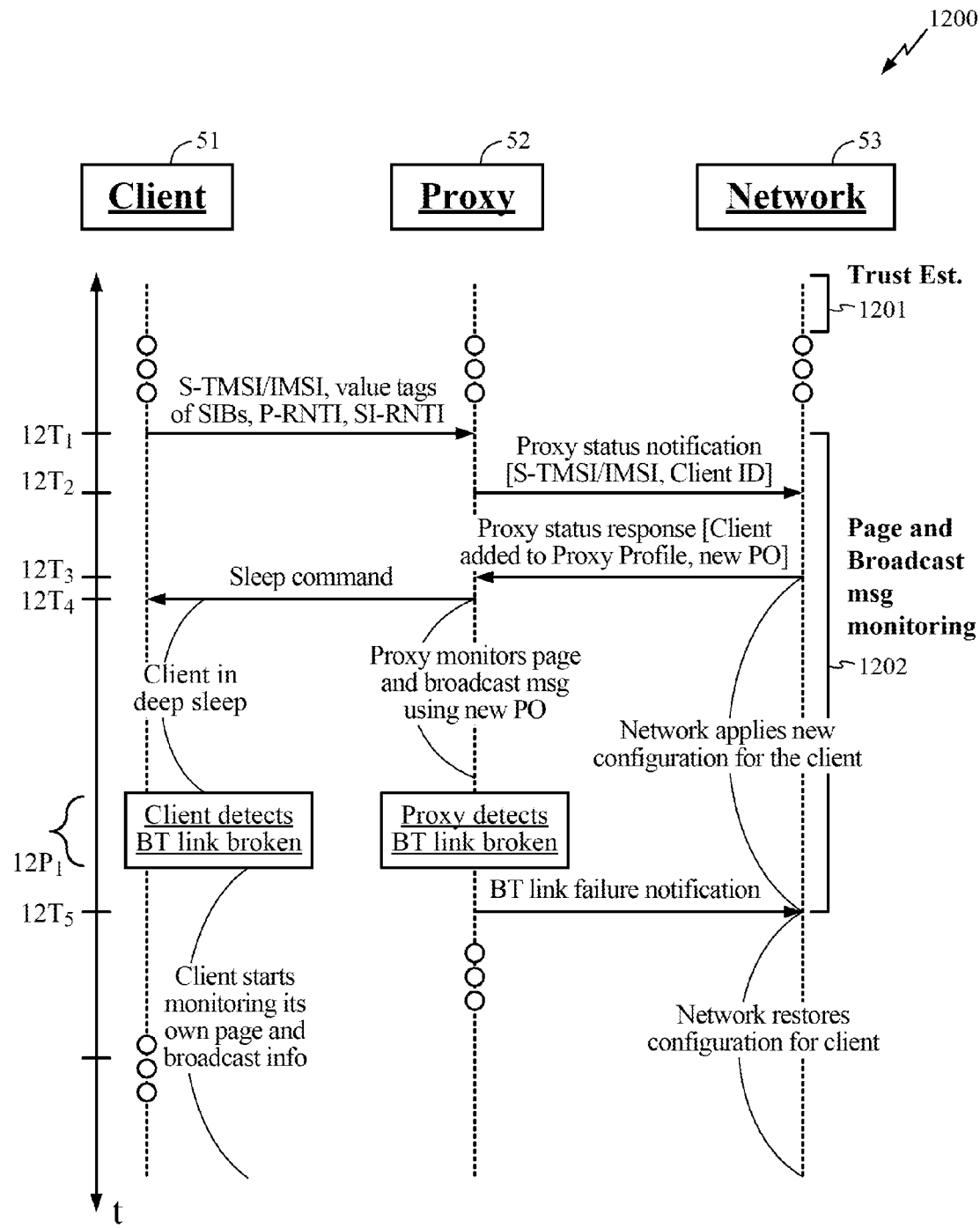
FIG. 12 is a message flow diagram illustrating the messaging that occurs between the client, the proxy, and the network during a proxy relationship configured according to one embodiment of the present teachings.

The example operation illustrated by the message flow diagram 1100 of FIG. 11 shows a normal proxy operation configured according to one embodiment of the present teachings. Variations to this procedure will occur during an operation that does not proceed according to normal circumstances. FIG. 12 is a message flow diagram 1200 illustrating the messaging that occurs between the client 51, the proxy 52, and the network 53 during a proxy relationship configured according to one embodiment of the present teachings. After the completion of the trust management phase 1201, the page and broadcast message monitoring stage 1202 begins at time $12T_1$ with the client 51 sending its IDs and MIB/SIBs value tags, to the proxy 52. The proxy 52 sends the proxy status notification to the network 53 at time $12T_2$, after which, at time $12T_3$, the network 53 sends the proxy status response message to the proxy 52. The proxy 52 issues the sleep command to the client 51 triggering the client to enter into a deep sleep at time $12T_4$. The network 53 updates the paging configuration for the client 51 and issues the new PO for the proxy 52 to use for monitoring.

At period $12P_1$, the client 51 and proxy 52 both detect that the short range protocol link has been broken. The proxy 52 transmits a link failure message to the network 1203 at time $12T_5$. This link failure message causes the network 53 to restore the original paging configuration for the client 51. The client 51, therefore, starts monitoring its own page and broadcast messages as it expects, using the original PO.

It should be noted that a link failure may also occur due to the failure of the proxy 52. In such case, the proxy 52 would be unavailable to transmit the link failure message. In this situation, the failed proxy 52 would also be unavailable to transmit the periodic proxy updates, such as the proxy updates sent at times $11T_5$ and $11T_6$ (FIG. 11). The network 53 will, therefore, not receive the updates before the expiration of the periodic registration timer. This expiration will be an indication to the network that the proxy-client relationship has been broken. After this determination is made, the network 53 will revert to the normal network paging configuration and will transmit a state change message to the client 51 causing the client 51 to resume monitoring its own page and broadcast messaging using the original PO.

Figure 13:
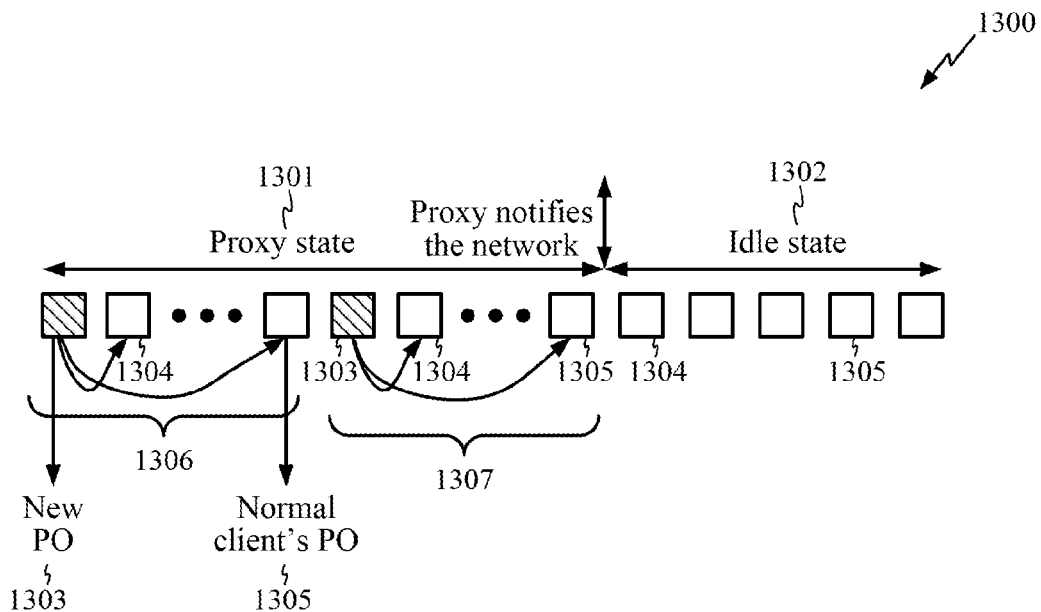
FIG. 13 is a block diagram illustrating a paging sequence configured according to one embodiment of the present teachings.

In addition to the proxy taking over the monitoring duties on behalf of the client mobile device, PO and paging messages used during the idle mode configured according to various embodiments of the present teachings may be optimized to reduce the power consumption of the proxy and also to reduce the paging load of the network. FIG. 13 is a block diagram illustrating a paging sequence 1300 configured according to one embodiment of the present teachings. The paging sequence 1300, as illustrated, is divided into two states, a proxy state 1301, during which a proxy-client relationship has been established, and an idle state 1302, during which the client 51 monitors for its own paging messages. During this proxy state 1301, the proxy 52 monitors POs and paging messages from the network on behalf of each client to which it has a proxy-client relationship. Should the proxy be required to monitor for each PO related to each client, it would consume a great deal of power with its high-power, long-range antenna/interface in an active state for long periods of time.

Instead of monitoring for each PO, the network, in the embodiment depicted in FIG. 13, generates a new proxy PO 1303 that will be transmitted during each DRX period, such as the DRX periods 1306 and 1307. The proxy may now only consume monitoring-related power specifically for its proxy PO 1303. The proxy PO 1303 includes a client ID for each client being paged. The network continues to transmit client POs during their normal periods, such as client POs 1304 and 1305. If the link is broken between the proxy and client, the client may reenter the idle state 1302 and immediately begin monitoring its own PO at its usual time. While the embodiment illustrated in FIG. 13 provides for the network to generate and transmit an additional message in this PO, the size of this message sent in the proxy PO 1303 is negligible in comparison to the power savings experienced by the proxy.

Figure 14:
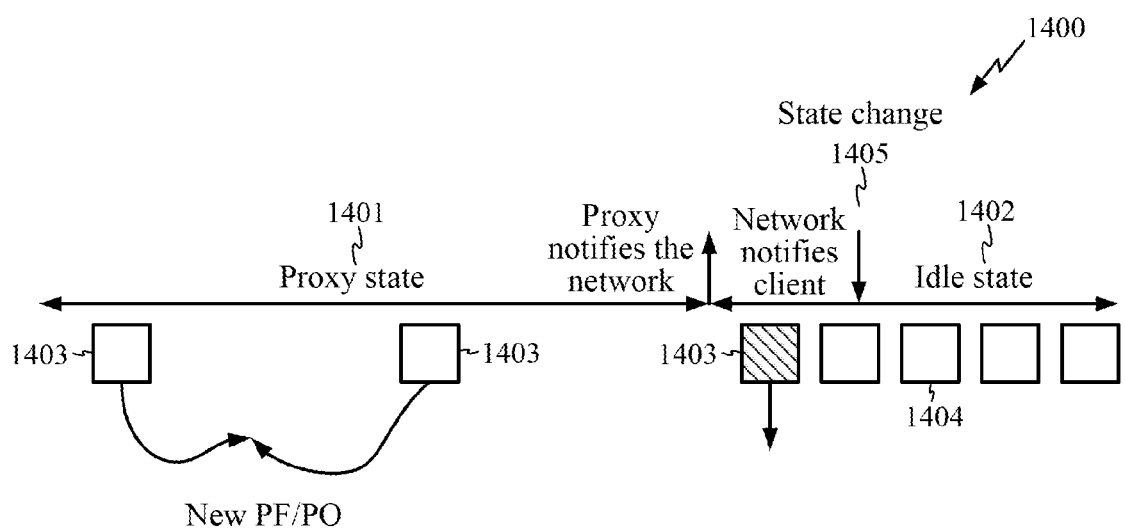
FIG. 14 is a block diagram illustrating a paging sequence configured according to one embodiment of the present teachings.

FIG. 14 is a block diagram illustrating a paging sequence 1400 configured according to one embodiment of the present teachings. The paging sequence 1400 is illustrated in two states: the proxy state 1401 and the idle state 1402. During the proxy state 1401, a new PO, or a paging frame (PF), if no further POs are available from the network, is generated by the network, i.e., the PO/PF 1403. Paging messages for all clients are sent in the PO/PF 1403. The proxy again need only monitor the PO/PF 1403 during the proxy state 1401, thus, saving power compared to monitoring for each individual PO for each client.

In the event that the link is broken between the client and the proxy, each client will reenter the idle state 1402 and begin monitoring the same PO/PF 1403 for any paging messages. The client receives indication of the new PO/PF 1403 from the proxy prior to entering the deep sleep. The proxy appends the new PO/PF 1403 to the sleep command given to the clients. Therefore, if the link is broken, the client knows of the PO/PF 1403. The client continues monitoring the PO/PF 1403 until it receives a state change message from the network, at which time the client will again begin monitoring its own PO 1404.

It should be noted that because each client will be paged over the same PO or the POs within the PF, i.e., the new PO/PF 1403, the collision probability for the random access channel (RACH) will increase. In order to reduce this probability, the various embodiments of the present teachings that utilize the PO optimization described in FIG. 14 will configure the proxy to assist in spacing out the transmission of pages to the clients.

Figure 15:
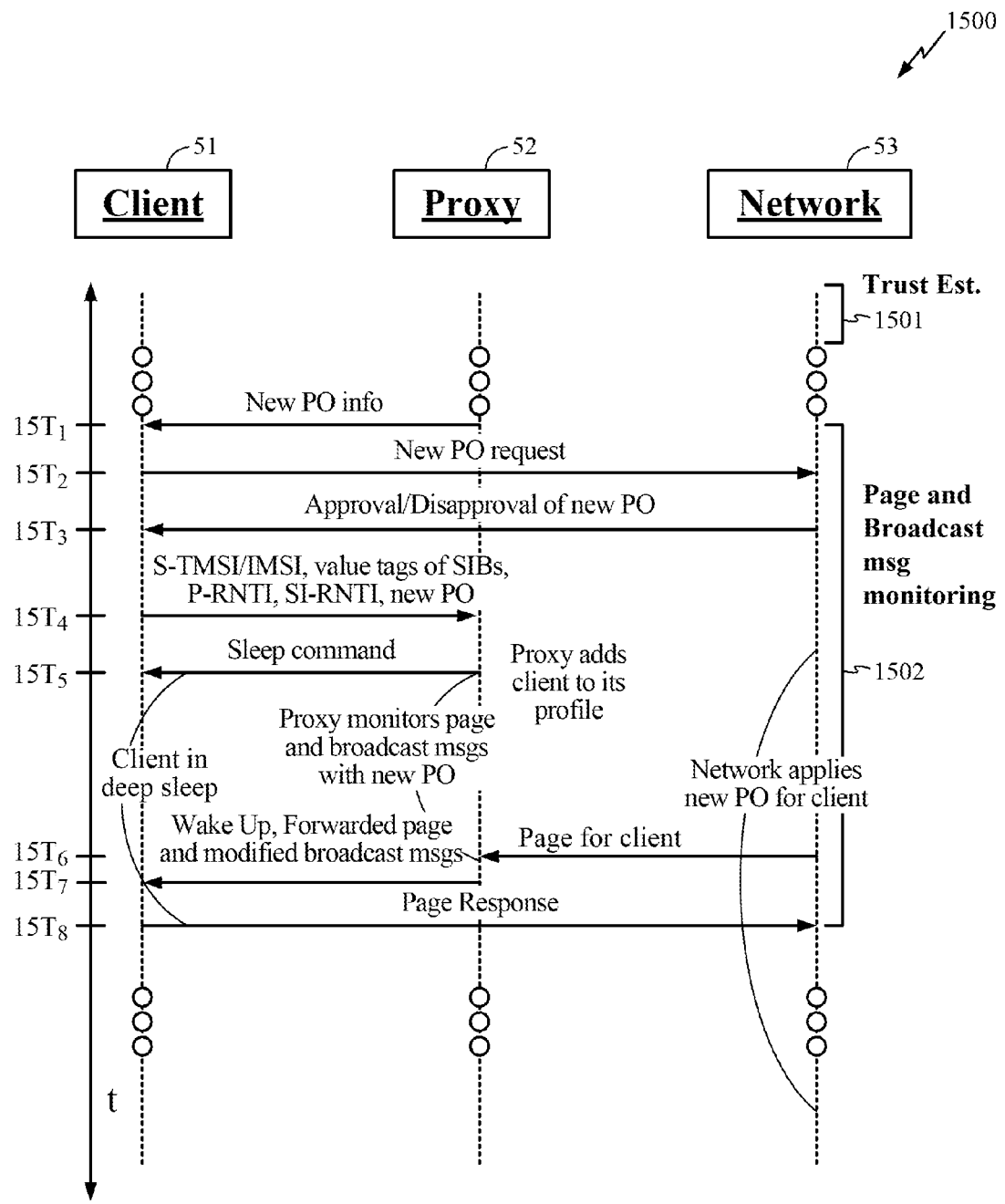
FIG. 15 is a message flow diagram illustrating the messaging that occurs between the client, proxy, and network in a proxy monitoring process configured according to one embodiment of the present teachings.

It should be noted that additional options for optimizing page monitoring operations occur transparent to the network. FIG. 15 is a message flow diagram 1500 illustrating the messaging that occurs between the client 51, the proxy 52, and the network 53 in a proxy monitoring process configured according to one embodiment of the present teachings. After the trust establishment process 1501 has been completed, the proxy 52 sends a message at time $15T_1$ to the client 51 identifying new PO information. The client 51 then sends a request to the network 53 at time $15T_2$ requesting this specific PO. At time $15T_3$, the network 53 sends an approval or disapproval of the new PO, and another assigned PO if the requested PO has been disapproved, to the client 51. The client 51 will then transmit its proxy page scheduling information with information, such as S-TMSI/IMSI, P-RNTI, SI-RNTI, the value tags for the SIBs, and now also the new, approved PO, to the proxy 52 at time $15T_4$.

On receiving this message and information, the proxy 52 adds the client 51 to its proxy profile. Once added to the profile, the proxy 52 issues the sleep command to the client 51 at time $15T_5$. The proxy 52 begins monitoring for pages in the new PO during the page and broadcast message monitoring session 1502. At time $15T_6$, the proxy 52 monitors the PO and receives a page for the client 51. The proxy 52 forwards the page and any modified broadcast messages to the client at time $15T_7$. The client 51 responds to the page at time $15T_8$, ending the page and broadcast message monitoring session 1502.

Figure 16:
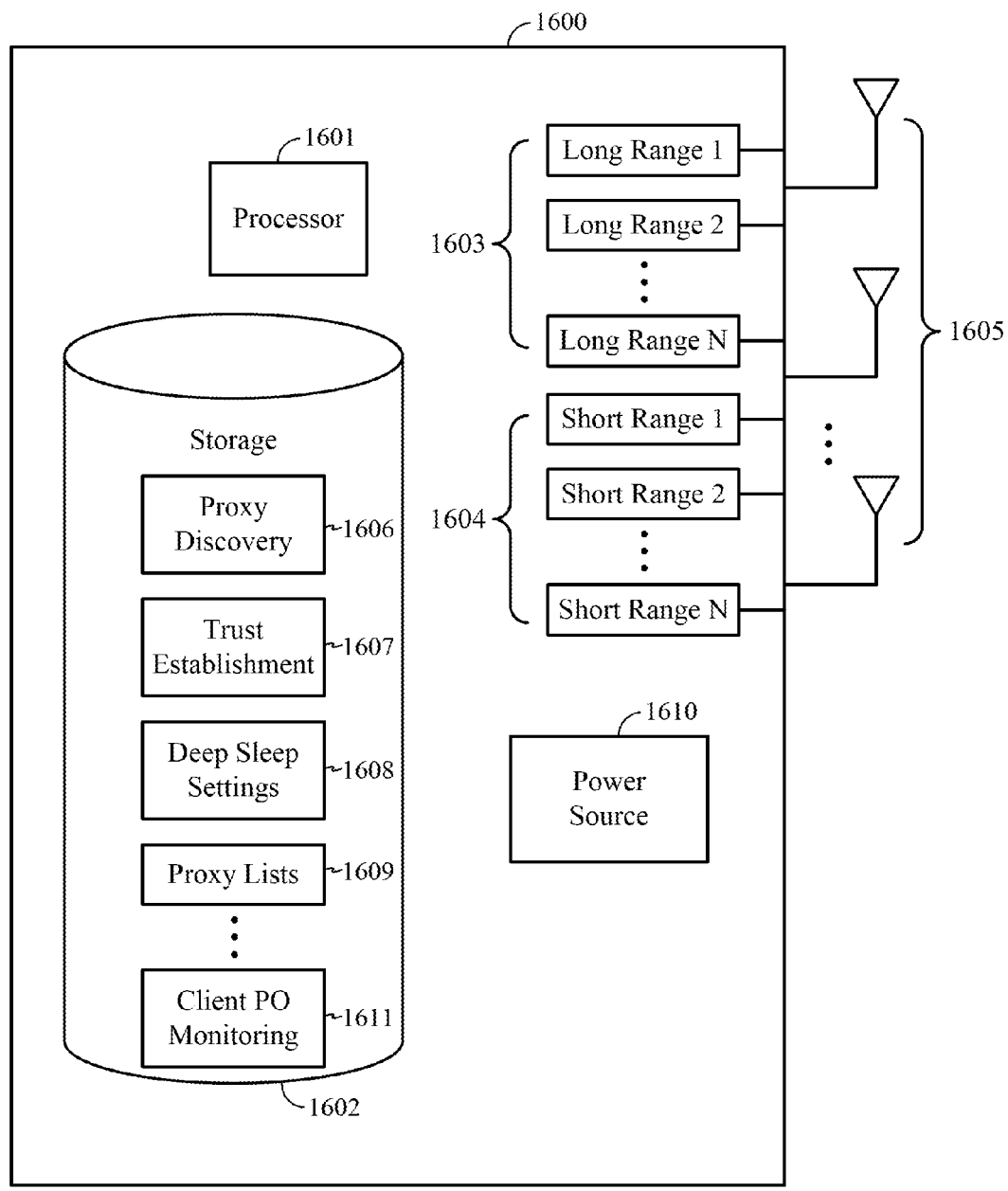
FIG. 16 is a block diagram illustrating a multiradio device configured according to one embodiment of the present teachings.

Each component of the systems configured according to various embodiments of the present teachings includes multiple hardware, firmware, and software pieces which, when operated together, create the functionality and operational environments used to implement the present teachings. FIG. 16 is a block diagram illustrating a multiradio device 1600 configured according to one embodiment of the present teachings. The multiradio device 1600 includes a processor 1601, which may be embodied as a single processor, multiple processors, a multi-core processor, or the like. The processor 1601 executes the instructions for operating the many functionalities of the multiradio device 1600. The multiradio device 1600 also includes a storage memory 1602 which stores the software code for the different applications and functionalities offered by the multiradio device 1600. The multiple long range 1603 and short range 1604 wireless interfaces operate with an antenna array 1605 to provide wireless radio frequency (RF) access to the multiradio device 1600. A power source 1610 provides the power to operate all of these components of the multiradio device 1600. In some embodiments, the power source 1610 may comprise a battery or other similar energy storage apparatus, while in other embodiments, the power source 1610 may comprise a wireline connection to another energy source.

The storage memory 1602 stores a proxy discovery application 1606. When executed by the processor 1601, the proxy discovery application 1606 controls how the multiradio device 1600 finds each available proxy with its wireless proximity. The proxy discovery application 1606 may define the operations described in the various embodiments illustrated in FIGS. 3A-3D and 4-8, depending on which embodiment has been implemented in the wireless network.

The storage memory 1602 also stores a trust establishment application 1607. When executed by the processor 1601, the trust establishment application 1607 controls how the multiradio device 1600 establishes an authenticated and secure communication session with the selected proxy device. The trust establishment application 1607 defines the operations described in at least one of the trust establishment embodiments illustrated in FIGS. 9 and 10, depending on which embodiment has been implemented by the wireless network or the multiradio device 1600.

During the proxy operation, the multiradio device 1600 is able to enter a deep sleep mode, which consumes much less power than a typical idle mode or idle mode with a slotted mode of operation. In order to enter this deep sleep when signaled by the proxy, the multiradio device 1600 uses the deep sleep settings 1608 stored on the storage memory 1602. By implementing these settings, the multiradio device 1600 turns of each of the specified components allowing for the realization of the power savings.

The storage memory 1602 also stores a proxy list 1609. The proxy list 1609 is the list of available proxies within the wireless proximity of the multiradio device 1600. The multiradio device 1600 uses this list to select the proxy with which to couple to for the proxy operation defined by the various embodiments of the present teachings. The proxy list 1609 may be generated or obtained by the various methods illustrated in FIGS. 3A-3D and 4-8, depending on which embodiment is operating in the wireless network.

The storage memory 1602 also stores a client PO/PF monitor application 1611. When executed by the processor 1601, the client PO/PF monitor application 1611 operates the multiradio device's 1600 own page message monitoring operations.

Figure 17:
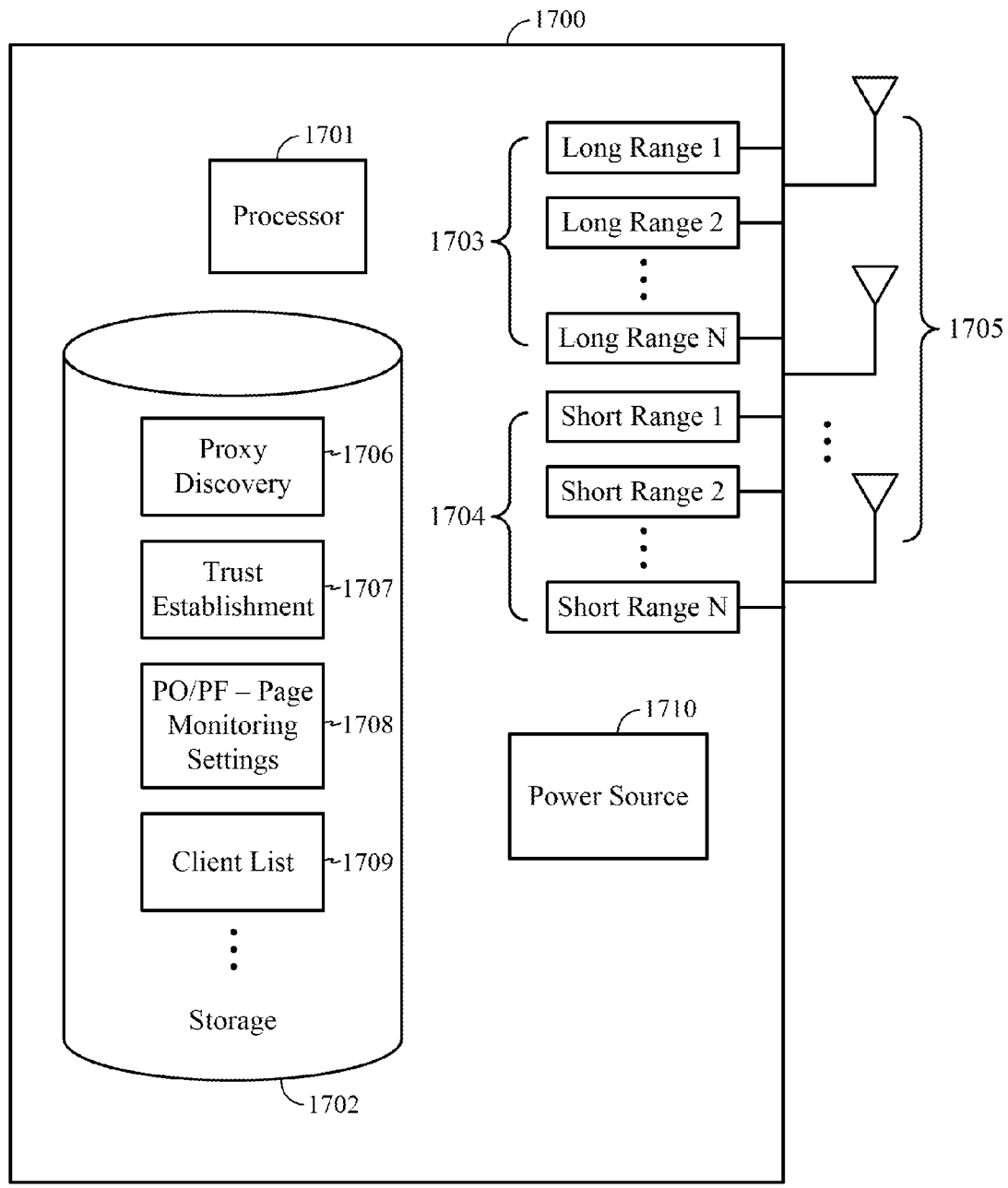
FIG. 17 is a block diagram illustrating a multiradio proxy device configured according to one embodiment of the present teachings.

FIG. 17 is a block diagram illustrating a multiradio proxy device 1700 configured according to one embodiment of the present teachings. The multiradio proxy device 1700 includes a processor 1701, which may be embodied as a single processor, multiple processors, a multi-core processor, or the like. The processor 1701 executes the instructions for operating the many functionalities of the multiradio proxy device 1700. The multiradio proxy device 1700 also includes a storage memory 1702 which stores the software code for the different applications and functionalities offered by the multiradio proxy device 1700. The multiple long range 1703 and short range 1704 wireless interfaces operate with an antenna array 1705 to provide wireless RF access to the multiradio proxy device 1700. A power source 1710 provides the power to operate all of these components of the multiradio proxy device 1600. The power source 1710 may be a constant power source, such as the alternating current power grid or it may also be a battery or other power storing mechanism.

The storage memory 1702 stores a proxy discovery application 1706. When executed by the processor 1701, the proxy discovery application 1706 controls how the multiradio proxy device 1700 communicates its availability to various client devices with its wireless proximity. The proxy discovery application 1706 defines the operations of at least one of the proxy discovery processes described in the various embodiments illustrated in FIGS. 3A-3D and 4-8, depending on which embodiment has been implemented in the wireless network.

The storage memory 1702 also stores a trust establishment application 1707. When executed by the processor 1701, the trust establishment application 1707 controls how the multiradio proxy device 1700 establishes an authenticated and secure communication session with the accessing client device. The trust establishment application 1707 defines the operations executed to implement as least one of the described trust establishment embodiments illustrated in FIGS. 9 and 10, depending on which embodiment has been implemented by the wireless network or the multiradio proxy device 1700.

The storage memory 1702 also stores the PO/PF-page monitoring settings 1708 and a client list 1709. When the trust establishment application 1707 has been executed, after which the client and the multiradio proxy device 1700 have been coupled for proxy operation, the multiradio proxy device 1700 updates the client list 1709 with the new client IDs and updates the PO/PF-page monitoring settings 1708 with the specific PO/PF information that will be used to monitor on behalf of that particular client device. Thus, in its monitoring operations, the multiradio proxy device 1700 uses the PO/PF information in the PO/PF-page monitoring settings 1708 to monitor for its clients pages from the network.

Figure 18:
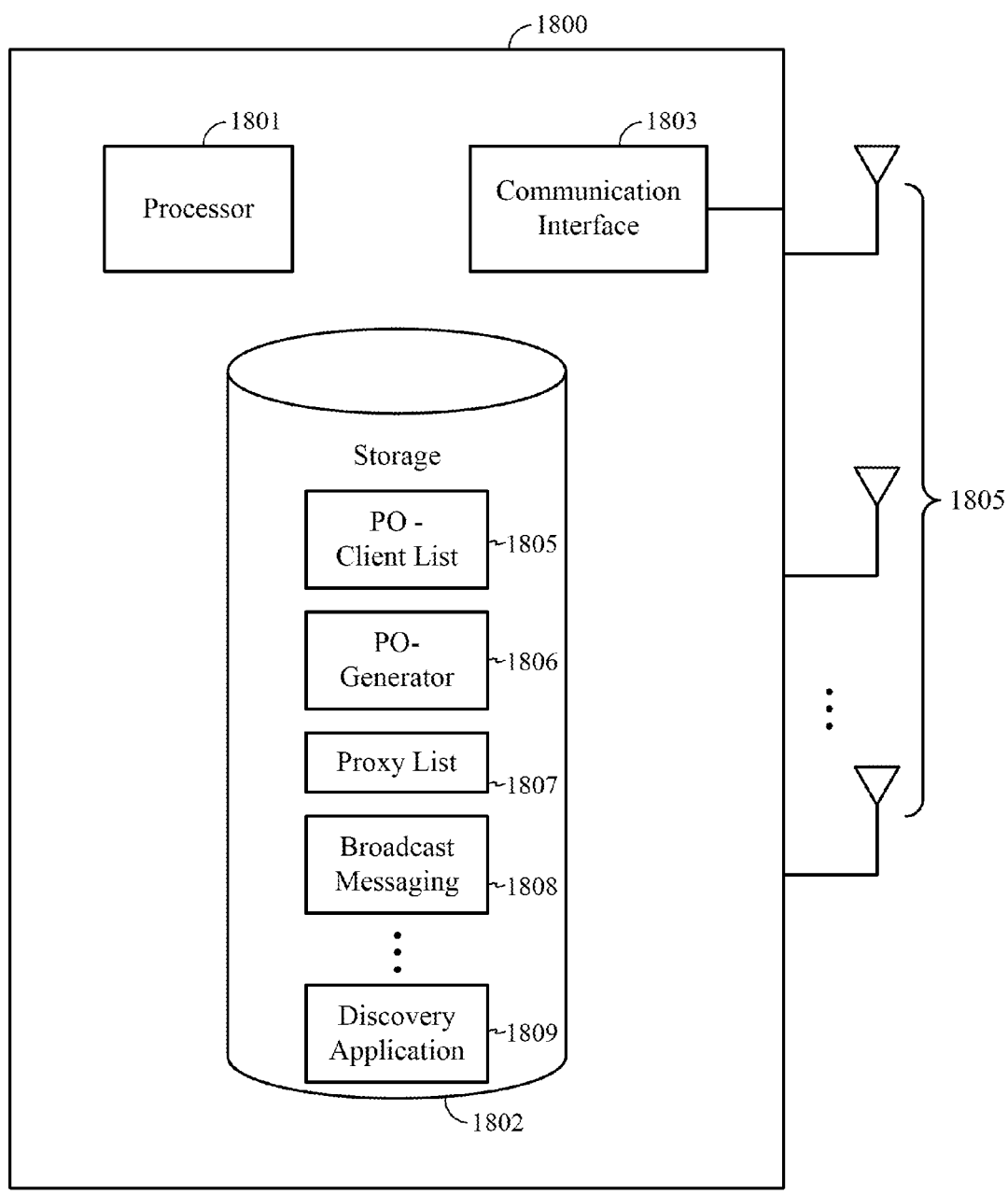
FIG. 18 is a block diagram illustrating a network server configured according to one embodiment of the present teachings.

FIG. 18 is a block diagram illustrating a network server 1800 configured according to one embodiment of the present teachings. The network server 1800 includes a processor 1801, which may be embodied as a single processor, multiple processors, a multi-core processor, or the like. The processor 1801 executes the instructions for operating the many functionalities of the network server 1800. The network server 1800 also includes a storage memory 1802 which stores the software code for the different applications and functionalities offered by the network server 1800. A communication interface 1803 operates with an antenna array 1804 to provide the network wireless communication access to all network devices.

A PO-client list 1805 is stored on storage memory 1802 that identifies and keeps track of the specific PO that is used for paging specific user devices on the network. When operating according to the embodiments described and illustrated in FIGS. 13-15, the PO-client list 1805 also includes the list of new POs or PFs that are directed to the proxy devices operating in the network. This stored information is placed by the PO generator application 1806. When executed by the processor 1801, the PO generator application 1806 generates the new POs or PFs that include the client device IDs being paged and that are directed at the operating proxies. The record of those newly generated POs and PFs is then stored in the PO-client list 1805.

The storage memory 1802 also stores a proxy list 1807. The proxy list 1807 identifies each proxy device that his been registered with the network. The list is maintained and updated as the proxy devices enter and exit the range of the network server 1800. Depending on the embodiment implemented in the network, the proxy list 1807 is communicated to various client devices either through direct messages or broadcast messages, as illustrated in FIGS. 3A-3D. When the embodiment that utilizes broadcast messages is implemented, the broadcast messaging application 1808, also stored on storage memory 1802, includes software code that adds the proxy list 1807 and updates to the proxy list 1807 to the broadcast messages. When executed by the processor 1801, the broadcast messaging application 1808 retrieves the proxy list 1807 from the storage memory 1802 and then adds the list to the broadcast messages prior to transmitting those messages onto the network over antenna array 1804.

The storage memory 1802 also stores a discovery application 1809. When executed by the processor 1801, the discovery application controls the operations that provide discovery assistance, such as by transmitting proxy list 1807 or receiving update to proxy list 1807 or by providing additional notifications to a client device or proxy, e.g., exchanging out-of-band security information, as shown in FIG. 10.

Figure 19:
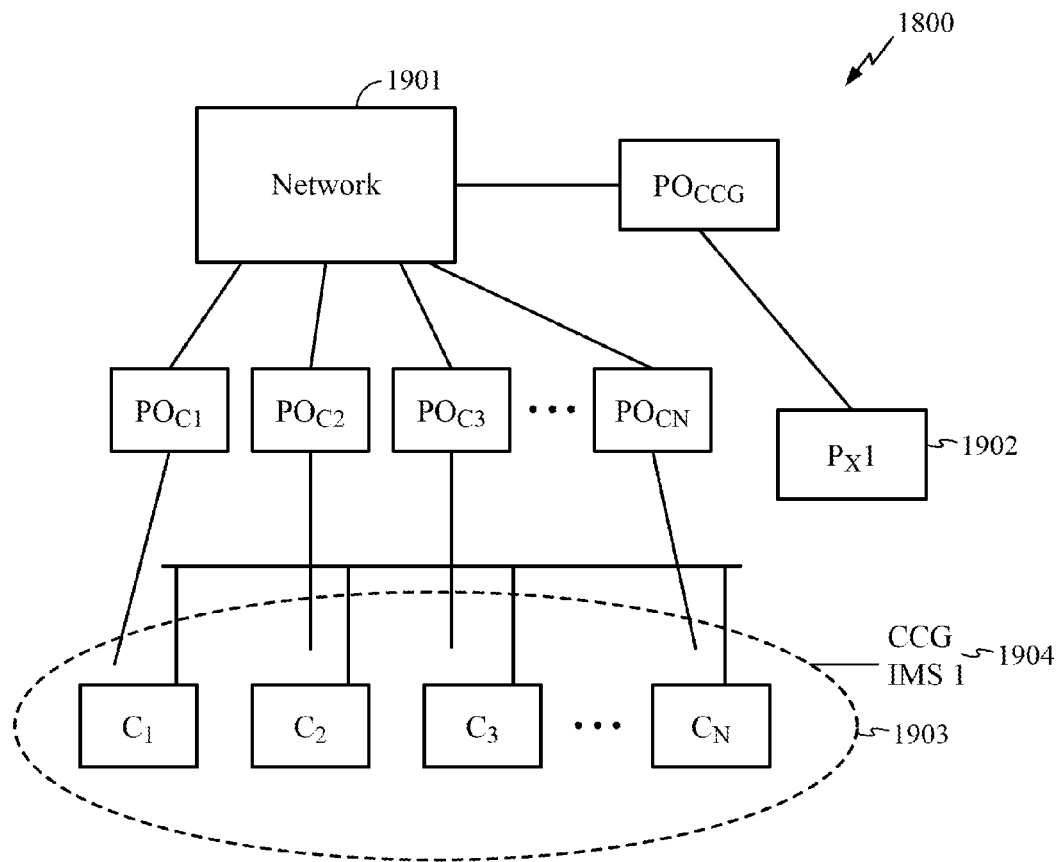
FIG. 19 is a block diagram illustrating a PO/PF generating process configured according to one embodiment of the present teachings.

In the embodiments described in FIGS. 13-15, it should be noted that the network may generate the new PO or PF (PO/PF). However, in additional and/or alternative embodiments that follow the implementations described in FIGS. 14 and 15, the new PO/PF may be derived from a special IMSI associated with a closed client group (CCG). FIG. 19 is a block diagram illustrating a PO/PF generating process 1900 configured according to one embodiment of the present teachings. The network 1901 maintains communications with the client devices C1-CN. The network 1901 generates specific POs for the client devices C1-CN, i.e., $PO_{C1}$-$PO_{CN}$. The client devices C1-CN each monitor for their specifically assigned PO for paging messages. When a proxy relationship is established between proxy PX1 and the client devices C1-CN, a CCG 1903 is formed and defined by the network 1901. A special IMSI, CCG IMSI 1904 identifies the CCG 1903. This CCG IMSI 1904 may be used to derive the new PO that will be used for paging any of the clients within the CCG 1903. The network 1901 then uses this new PO, $PO_{CCG}$, to broadcast notification of paging messages for each of the clients C1-CN.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine or computer readable medium tangibly embodying instructions may be used in implementing the methodologies described herein. For example, software code may be stored in a memory and executed by a processor. When executed by the processor, the executing software code generates the operational environment that implements the various methodologies and functionalities of the different aspects of the teachings presented herein. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

The machine or computer readable medium that stores the software code defining the methodologies and functions described herein includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. As used herein, disk and/or disc includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Figure 20:
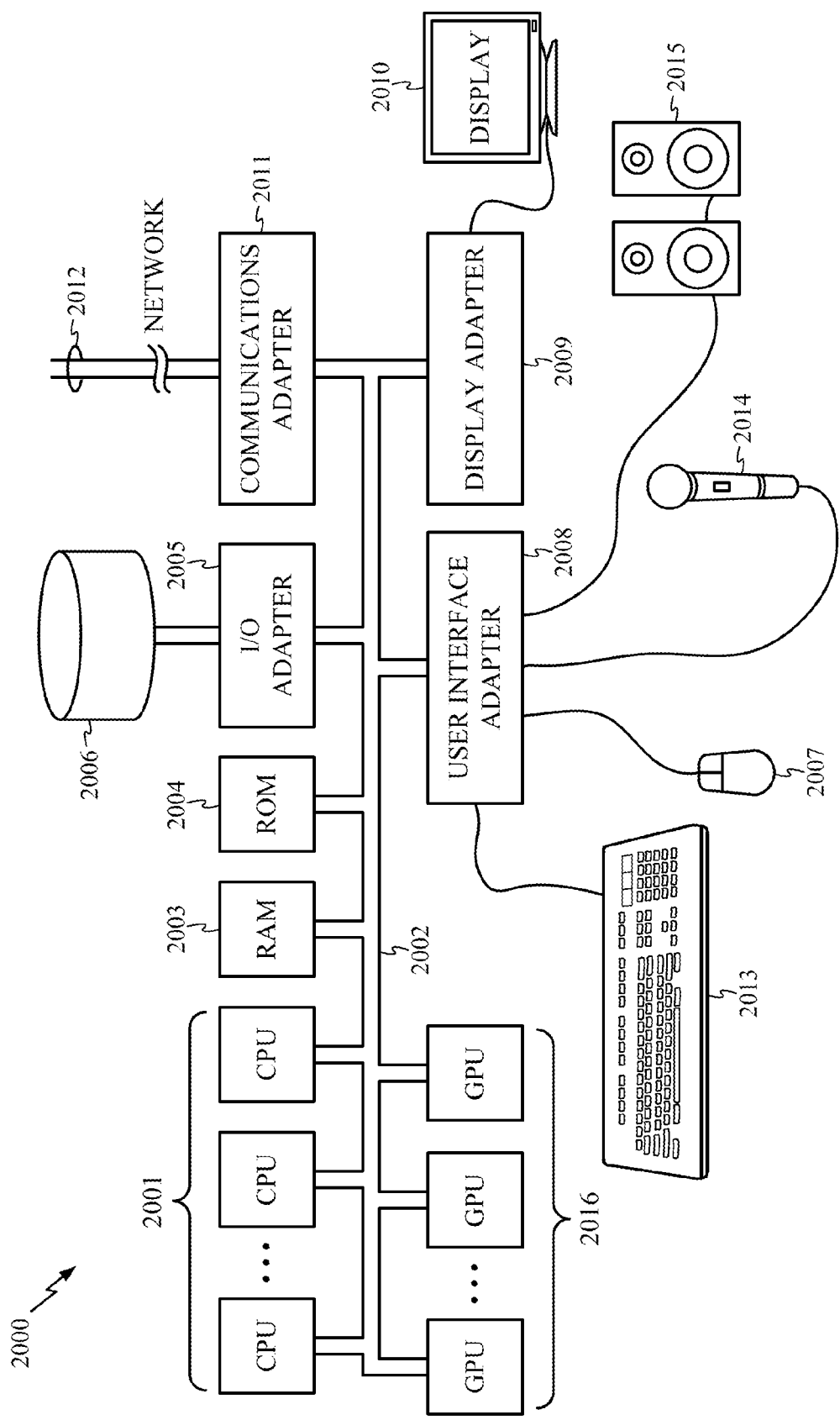
FIG. 20 illustrates an exemplary computer system which may be employed to implement any of the client or proxy multiradio devices or the base stations according to certain embodiments of the present teachings.

FIG. 20 illustrates an exemplary computer system 2000 which may be employed to implement any of the client or proxy multiradio devices or the base stations according to certain embodiments of the present teachings. A central processing unit ("CPU" or "processor") 2001 is coupled to a system bus 2002. The CPU 2001 may be any general-purpose processor. The present disclosure is not restricted by the architecture of the CPU 2001 (or other components of the exemplary computer system 2000) as long as the CPU 2001 (and other components of the exemplary computer system 2000) supports the operations as described herein. As such the CPU 2001 may provide processing to the exemplary computer system 2000 through one or more processors or processor cores. The CPU 2001 may execute the various logical instructions described herein. For example, the CPU 2001 may execute machine-level instructions according to the exemplary operational flow described above in conjunction with FIGS. 2A-B, 3A-D, and 4-15. When executing instructions representative of the functionalities illustrated in FIGS. 2A-B, 3A-D, and 4-15, the CPU 2001 becomes a special-purpose processor of a special purpose computing platform configured specifically to operate according to the various aspects of the teachings described herein.

The exemplary computer system 2000 also includes random access memory (RAM) 2003, which may be SRAM, DRAM, SDRAM, or the like. The exemplary computer system 2000 includes read-only memory (ROM) 2004 which may be PROM, EPROM, EEPROM, or the like. The RAM 2003 and ROM 2004 hold user and system data and programs, as is well known in the art.

The exemplary computer system 2000 also includes an input/output (I/O) adapter 2005, communications adapter 2011, user interface adapter 2008, and display adapter 2009. The I/O adapter 2005, user interface adapter 2008, and/or the communications adapter 2011 may, in certain aspects, enable a user to interact with the exemplary computer system 2000 in order to input information.

The I/O adapter 2005 couples a storage device(s) 2006, such as one or more of a hard drive, compact disc (CD) drive, floppy disk drive, tape drive, etc., to the exemplary computer system 2000. The storage devices 2006 are utilized in addition to the RAM 2003 for the memory requirements associated with performing the operations associated with the client and proxy multiradio devices and the network servers configured according to various aspects of the present teachings. The communications adapter 2011 is adapted to couple the exemplary computer system 2000 to a network 2012, which may enable information to be input to and/or output from the exemplary computer system 2000 via the network 2012 (e.g., the Internet or other wide-area network, a local-area network, a public or private switched telephony network, a wireless network, or any combination of the foregoing). A user interface adapter 2008 couples user input devices, such as a keyboard 2013, a pointing device 2007, and a microphone 2014 and/or output devices, such as speaker(s) 2015 to the exemplary computer system 2000. The display adapter 2009 is driven by the CPU 2001 or by a graphical processing unit (GPU) 2016 to control the display on a display device 2010, for example, to display an incoming message or call on a client mobile device. A GPU 2016 may be any various number of processors dedicated to graphics processing and, as illustrated, may be made up of one or more individual graphical processors. A GPU 2016 processes the graphical instructions and transmits those instructions to a display adapter 2009. The display adapter 2009 further transmits those instructions for transforming or manipulating the state of the various numbers of pixels used by the display device 2010 to visually present the desired information to a user. Such instructions include instructions for changing state from on to off, setting a particular color, intensity, duration, or the like. Each such instruction makes up the rendering instructions that control how and what is displayed on the display device 2010.

It shall be appreciated that the present disclosure is not limited to the architecture of the exemplary computer system 2000. For example, any suitable processor-based device may be utilized for implementing the cooperative operation of the multiradio devices, including without limitation personal computers, laptop computers, computer workstations, multi-processor servers, mobile telephones, and other such mobile devices. Moreover, certain aspects may be implemented on application specific integrated circuits (ASICs) or very large scale integrated (VLSI) circuits. In fact, persons of ordinary skill in the art may utilize any number of suitable structures capable of executing logical operations according to the aspects.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present teachings. Accordingly, the appended claims are intended to include within their scope such processes, machines, manufacture, compositions of matter, means, methods, or steps.

What is claimed is:

1. A method of establishing trust between a client multiradio device and a proxy device, said method comprising:
   receiving a request for a bootstrapping transaction identifier (B_TID) at said client multiradio device from said proxy device, wherein said request includes a client network application function (NAF) identifier (ID);
   transmitting said client NAF ID and said B_TID from said client multiradio device to said proxy device using a short range communication protocol;
   receiving public key information from said proxy device and confirming said public key information at said client device over said short range communication protocol, wherein said public key information is generated by a network server and communicated over a long range communication protocol to said proxy device; and
   calculating an encryption key using said public key information.

2. The method of claim 1 further comprising:
   encrypting each packet transmitted from said client multiradio device to said proxy device using said encryption key; and
   decrypting each packet received from said proxy device using said encryption key.

3. A multiradio device comprising:
   a processor;
   at least one short range interface coupled to said processor;
   at least one long range interface coupled to said processor;
   an antenna array coupled to said at least one short range interface and said at least one long range interface;
   a power source coupled to said processor;
   a storage device coupled to said processor; and
   a trust establishment application stored on said storage device, wherein, when executed by said processor, said trust establishment application configures said multiradio device to:
      receive a request for a bootstrapping transaction identifier (B_TID) over said antenna array from said proxy device, wherein said request includes a client network application function (NAF) identifier (ID);
      transmit said client NAF ID and said B_TID from said multiradio device to said proxy device using said at least one short range interface;
      receive public key information from said proxy device and confirm said public key information at said multiradio device over said at least one short range interface, wherein said public key information is generated by a network server and communicated over a long range communication protocol to said proxy device; and
      calculate an encryption key using said public key information.

4. The multiradio device of claim 3 wherein said executed trust establishment application further configures said multiradio device to encrypt each packet transmitted from said multiradio device to said proxy device using said encryption key and decrypt each packet received from said proxy device using said encryption key.

5. A non-transitory computer readable medium including program code tangibly stored thereon, comprising:
   program code to receive a request for a bootstrapping transaction identifier (B_TID) at a client multiradio device from said proxy device, wherein said request includes a client network application function (NAF) identifier (ID);
   program code to transmit said client NAF ID and said B_TID from said client multiradio device to said proxy device using a short range communication protocol;
   program code to receive and confirm public key information from said proxy device at said client device over said short range communication protocol, wherein said public key information is generated by a network server and communicated over a long range communication protocol to said proxy device; and
   program code to calculate an encryption key using said public key information.

6. The computer readable medium of claim 5 further comprising:
   program code to encrypt each packet transmitted from said client multiradio device to said proxy device using said encryption key; and
   program code to decrypt each packet received from said proxy device using said encryption key.

7. A method of establishing trust between a client multiradio device and a proxy device, said method comprising:
   transmitting a request to said client multiradio device for a bootstrapping transaction identifier (B_TID) over a short range communication protocol from said proxy device, wherein said request includes a client network application function (NAF) identifier (ID);
   receiving said client NAF ID and said B_TID from said client multiradio device at said proxy device over said short range communication protocol;
   transmitting over a long range communication protocol a proxy ID of said proxy device and said B_TID to a network server;
   receiving public key information over said long range communication protocol from said network server, wherein said public key information is calculated by said network server based in part on said proxy ID and said B_TID;
   transmitting over said short range communication protocol said public key information from said proxy device to said client multiradio device; and
   calculating an encryption key using said public key information.

8. The method of claim 7 further comprising:
   encrypting each packet transmitted from said proxy device to said client multiradio device using said encryption key; and
   decrypting each packet received at said proxy device from said client multiradio device using said encryption key.

9. A multiradio proxy device comprising:
a processor;
at least one short range interface coupled to said processor;
at least one long range interface coupled to said processor;
an antenna array coupled to said at least one short range interface and said at least one long range interface;
a power source coupled to said processor;
a storage device coupled to said processor; and
a trust establishment application stored on said storage device, wherein, when executed by said processor, said trust establishment application configures said multiradio proxy device to:
  transmit a request to a client multiradio device for a bootstrapping transaction identifier (B_TID) over a short range communication protocol, wherein said request includes a client network application function (NAF) identifier (ID);
  receive said client NAF ID and said B_TID from said client multiradio device over said short range communication protocol;
  transmit over a long range communication protocol a proxy ID of said multiradio proxy device and said B_TID to a network server;
  receive public key information over said long range communication protocol from said network server, wherein said public key information is calculated by said network server based in part on said proxy ID and said B_TID;
  transmit over said short range communication protocol said public key information to said client multiradio device; and
  calculate an encryption key using said public key information.

10. The multiradio proxy device of claim 9 wherein said executed trust establishment application further configures said multiradio proxy device to:
  encrypt each packet transmitted from said multiradio proxy device to said client multiradio device using said encryption key; and
  decrypt each packet received at said multiradio proxy device from said client multiradio device using said encryption key.

11. A non-transitory computer readable medium including program code tangibly stored thereon, comprising:
  program code to transmit a request to a client multiradio device for a bootstrapping transaction identifier (B_TID) over a short range communication protocol from a multiradio proxy device, wherein said request includes a client network application function (NAF) identifier (ID);
  program code to receive said client NAF ID and said B_TID from said client multiradio device at said multiradio proxy device over said short range communication protocol;
  program code to transmit over a long range communication protocol a proxy ID of said multiradio proxy device and said B_TID to a network server;
  program code to receive public key information over said long range communication protocol from said network server, wherein said public key information is calculated by said network server based in part on said proxy ID and said B_TID;
  program code to transmit over said short range communication protocol said public key information from said multiradio proxy device to said client multiradio device; and
  program code to calculate an encryption key using said public key information.

12. The computer readable medium of claim 11 further comprising:
  program code to encrypt each packet transmitted from said multiradio proxy device to said client multiradio device using said encryption key; and
  program code to decrypt each packet received at said multiradio proxy device from said client multiradio device using said encryption key.

* * * * *